(12) United States Patent
Qiu et al.

(10) Patent No.: US 11,526,526 B2
(45) Date of Patent: Dec. 13, 2022

(54) GENERATING DIMENSION-BASED VISUAL ELEMENTS

(71) Applicant: Business Objects Software LTD, Dublin (IE)

(72) Inventors: Xin Qiu, Vancouver (CA); Yang Jin, Vancouver (CA); Sumedha Sharma, Vancouver (CA); James Lloyd, Vancouver (CA)

(73) Assignee: SAP SE, Walldorf (DE)

( * ) Notice: Subject to any disclaimer, the term of this patent is extended or adjusted under 35 U.S.C. 154(b) by 162 days.

(21) Appl. No.: 16/672,067

(22) Filed: Nov. 1, 2019

(65) Prior Publication Data

US 2021/0133187 A1  May 6, 2021

(51) Int. Cl.
| | |
|---|---|
| *G06F 16/248* | (2019.01) |
| *G06F 16/28* | (2019.01) |
| *G06T 11/20* | (2006.01) |
| *G06F 16/22* | (2019.01) |
| *G06F 16/245* | (2019.01) |

(52) U.S. Cl.
CPC ........ *G06F 16/248* (2019.01); *G06F 16/2264* (2019.01); *G06F 16/245* (2019.01); *G06F 16/287* (2019.01); *G06T 11/206* (2013.01)

(58) Field of Classification Search
CPC .. G06F 16/248; G06F 16/2264; G06F 16/287; G06F 16/245; G06T 11/206
See application file for complete search history.

(56) References Cited

U.S. PATENT DOCUMENTS

| | | | | |
|---|---|---|---|---|
| 5,475,810 | A * | 12/1995 | Sasaki ................... | G06T 11/206 715/834 |
| 7,714,861 | B1 * | 5/2010 | Ragucci ................ | G06T 11/206 345/440 |
| 8,489,641 | B1 * | 7/2013 | Seefeld ................. | G06F 16/248 707/792 |
| 9,299,170 | B1 * | 3/2016 | Moon .................... | G06T 11/206 |
| 9,953,372 | B1 * | 4/2018 | Dziabiak ............... | G06Q 30/02 |
| 2005/0068320 | A1 * | 3/2005 | Jaeger .................. | G06T 11/206 345/440 |
| 2008/0010273 | A1 * | 1/2008 | Frank ................... | G06F 16/9537 707/999.005 |
| 2008/0162209 | A1 * | 7/2008 | Gu .................... | G06Q 10/06375 |
| 2009/0132469 | A1 * | 5/2009 | White .................... | G06Q 10/00 |

(Continued)

*Primary Examiner* — Phenuel S Salomon
(74) *Attorney, Agent, or Firm* — Fountainhead Law Group P.C.

(57) ABSTRACT

In some embodiments, a program generates a query for a set of data from a dataset. The dataset includes a set of measures and a plurality of dimensions for categorizing the set of measures. The set of data includes a set of locations and measure values for a measure in the set of measures categorized according to a dimension in the plurality of dimensions. The program further sends the query to a computing system configured to manage the dataset. The program also receives the set of data from the computing system. The program further renders a visualization comprising a set of visual elements. Each visual element is configured to present a set of measure values for the measure associated with a location in the set of locations. The set of measure values are categorized according to the dimension. The program also presents the visualization on a display of the device.

20 Claims, 21 Drawing Sheets

(56) References Cited

U.S. PATENT DOCUMENTS

| | | | | |
|---|---|---|---|---|
| 2009/0319556 | A1* | 12/2009 | Stolte | G09B 29/00 |
| 2013/0346429 | A1* | 12/2013 | Bratz | G06F 16/25 |
| | | | | 707/758 |
| 2015/0082219 | A1 | 3/2015 | Beck et al. | |
| 2015/0254369 | A1* | 9/2015 | Hou | G06F 16/904 |
| | | | | 707/798 |
| 2016/0034553 | A1* | 2/2016 | Tong | G06F 16/285 |
| | | | | 707/609 |
| 2016/0055232 | A1* | 2/2016 | Yang | G06T 11/206 |
| | | | | 707/740 |
| 2016/0124960 | A1* | 5/2016 | Moser | G06T 11/206 |
| | | | | 707/723 |
| 2016/0162165 | A1* | 6/2016 | Lingappa | G06F 40/106 |
| | | | | 715/771 |
| 2016/0342304 | A1* | 11/2016 | Kodavali | G06F 3/0481 |
| 2017/0053425 | A1* | 2/2017 | Lee | G06T 11/206 |
| 2017/0193116 | A1* | 7/2017 | Wong | G06F 16/2428 |
| 2018/0336710 | A1* | 11/2018 | Zhao | G06F 16/283 |
| 2019/0155804 | A1* | 5/2019 | Miller | G06Q 10/00 |
| 2019/0303451 | A1* | 10/2019 | Takahashi | G06F 16/287 |
| 2019/0340304 | A1 | 11/2019 | Bak et al. | |
| 2020/0125559 | A1* | 4/2020 | Talbot | G06F 16/2456 |
| 2020/0233905 | A1 | 7/2020 | Williams et al. | |

\* cited by examiner

400

{
405 → Product Dimension Value: "Juices",
Gross Margin Measure Value: 243.54,
Location Coordinates: (-13042302.86084, 3857628.40814)
},
{
410 → Product Dimension Value: "Carbonated Drinks",
Gross Margin Measure Value: 164.62,
Location Coordinates: (-13042302.86084, 3857628.40814)
},
{
415 → Product Dimension Value: "Alcohol",
Gross Margin Measure Value: 104.03,
Location Coordinates: (-13042302.86084, 3857628.40814)
},
{
420 → Product Dimension Value: "Others",
Gross Margin Measure Value: 22.85,
Location Coordinates: (-13042302.86084, 3857628.40814)
},

{
Location Coordinates: (-13042302.86084, 3857628.40814)
Total: 535.04
Parts: [
{
505 → Product Dimension Value: "Juices",
Gross Margin Measure Value: 243.54,
},
{
510 → Product Dimension Value: "Carbonated Drinks",
Gross Margin Measure Value: 164.62,
},
{
515 → Product Dimension Value: "Alcohol",
Gross Margin Measure Value: 104.03,
},
{
520 → Product Dimension Value: "Others",
Gross Margin Measure Value: 22.85,
},
]
}

FIG. 5

GENERATING DIMENSION-BASED VISUAL ELEMENTS

BACKGROUND

Maps and mapping technology are used in many current computing and mobile applications and services. For example, some applications or services utilize mapping technology to provide navigation functions, location functions, traffic congestion functions, etc. Other applications or services may employ mapping technology to provide location-based search functions, social-networking functions, ride-sharing services, etc. In addition, some applications or services can use maps to present data that has a geographical component associated with it.

SUMMARY

In some embodiments, a non-transitory machine-readable medium stores a program executable by at least one processing unit of a device. The program generates a query for a set of data from a dataset. The dataset includes a set of measures and a plurality of dimensions for categorizing the set of measures. The set of data includes a set of locations and measure values for a measure in the set of measures categorized according to a dimension in the plurality of dimensions. The program further sends the query to a computing system configured to manage the dataset. The program also receives the set of data from the computing system. The program further renders a visualization comprising a set of visual elements. Each visual element is configured to present a set of measure values for the measure associated with a location in the set of locations. The set of measure values are categorized according to the dimension. The program also presents the visualization on a display of the device.

In some embodiments, the set of data received from the computing system may include a plurality of records. Each record may include a measure value for the measure, a dimension value for the dimension, and a location in the set of locations. The program may further generate a data structure based on the set of data by aggregating together records in the set of data having the same location. Rendering the visualization may include rendering the visualization based on the generated data structure.

In some embodiments, each visual element of the visualization may include a visible element and an invisible element. The visible element may be configured to present the set of measure values of the measure associated with the location in the set of locations and categorized according to the dimension. The invisible element may be configured to receive input for interacting with the visual element. The visible element of each visual element may include a set of sections. Each section may be for presenting a measure value in the set of measure values associated with a dimension value of the dimension. The program may further receive a selection of a location within a visual element, determine a first set of coordinates of the location within the visual element, determine a second set of coordinates of a location of a center of the visual element, and determine an angle between a first line formed by a defined set of coordinates within the visual element and the second set of coordinates and a second line formed by the first set of coordinate and the second set of coordinates. The program may further determine a selected section based on the determined angle, generate a new visual element that includes the selected circular section highlighted, and replace the visual element in the visualization with the new visual element. The program may further provide for the selected section a display area configured to present the measure value for the measure associated the dimension value represented by the selected section.

In some embodiments, a method, executable by a device, generate a query for a set of data from a dataset. The dataset includes a set of measures and a plurality of dimensions for categorizing the set of measures. The set of data includes a set of locations and measure values for a measure in the set of measures categorized according to a dimension in the plurality of dimensions. The method further sends the query to a computing system configured to manage the dataset. The method also receives the set of data from the computing system. The method further renders a visualization comprising a set of visual elements. Each visual element is configured to present a set of measure values for the measure associated with a location in the set of locations. The set of measure values are categorized according to the dimension. The method also presents the visualization on a display of the device.

In some embodiments, the set of data received from the computing system may include a plurality of records. Each record may include a measure value for the measure, a dimension value for the dimension, and a location in the set of locations. The method may further generate a data structure based on the set of data by aggregating together records in the set of data having the same location. Rendering the visualization may include rendering the visualization based on the generated data structure.

In some embodiments, each visual element of the visualization may include a visible element and an invisible element. The visible element may be configured to present the set of measure values of the measure associated with the location in the set of locations and categorized according to the dimension. The invisible element may be configured to receive input for interacting with the visual element. The visible element of each visual element may include a set of sections. Each section may be for presenting a measure value in the set of measure values associated with a dimension value of the dimension. The method may further receive a selection of a location within a visual element, determine a first set of coordinates of the location within the visual element, determine a second set of coordinates of a location of a center of the visual element, and determine an angle between a first line formed by a defined set of coordinates within the visual element and the second set of coordinates and a second line formed by the first set of coordinate and the second set of coordinates. The method may further determine a selected section based on the determined angle, generate a new visual element that includes the selected circular section highlighted, and replace the visual element in the visualization with the new visual element. The method may further provide for the selected section a display area configured to present the measure value for the measure associated the dimension value represented by the selected section.

In some embodiments, a system includes a set of processing units and a non-transitory machine-readable medium that stores instructions. The instructions cause at least one processing unit to generate a query for a set of data from a dataset. The dataset includes a set of measures and a plurality of dimensions for categorizing the set of measures. The set of data includes a set of locations and measure values for a measure in the set of measures categorized according to a dimension in the plurality of dimensions. The instructions further cause the at least one processing unit to send the query to a computing system configured to manage the dataset. The instructions also cause the at least one processing unit to receive the set of data from the computing system. The instructions further cause the at least one processing unit to render a visualization comprising a set of visual elements. Each visual element is configured to present a set of measure values for the measure associated with a location in the set of locations. The set of measure values are categorized according to the dimension. The instructions also cause the at least one processing unit to present the visualization on a display of the system.

In some embodiments, the set of data received from the computing system may include a plurality of records. Each record may include a measure value for the measure, a dimension value for the dimension, and a location in the set of locations. The instructions may further cause the at least one processing unit to generate a data structure based on the set of data by aggregating together records in the set of data having the same location. Rendering the visualization may include rendering the visualization based on the generated data structure.

In some embodiments, each visual element of the visualization may include a visible element and an invisible element. The visible element may be configured to present the set of measure values of the measure associated with the location in the set of locations and categorized according to the dimension. The invisible element may be configured to receive input for interacting with the visual element. The visible element of each visual element may include a set of sections. Each section may be for presenting a measure value in the set of measure values associated with a dimension value of the dimension. The instructions may further cause the at least one processing unit to receive a selection of a location within a visual element, determine a first set of coordinates of the location within the visual element, determine a second set of coordinates of a location of a center of the visual element, and determine an angle between a first line formed by a defined set of coordinates within the visual element and the second set of coordinates and a second line formed by the first set of coordinate and the second set of coordinates. The instructions may further cause the at least one processing unit to determine a selected section based on the determined angle, generate a new visual element that includes the selected circular section highlighted, and replace the visual element in the visualization with the new visual element.

The following detailed description and accompanying drawings provide a better understanding of the nature and advantages of the present invention.

BRIEF DESCRIPTION OF THE DRAWINGS

FIG. 4 illustrates example records in a set of data according to some embodiments.

FIG. 5 illustrates an example data structure generated based on the records illustrated in FIG. 4 according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing dimension-based visual elements. In some embodiments, a client device accesses an application operating on a computing device. A user of the client device may use the application to view data from a dataset that is mapped onto a view of a map. The application can provide data associated with a different regions (e.g., points, areas, etc.) of the map. The client device may present the data for different regions of the map as different visual elements (e.g., charts). In some embodiments, the client device includes a feature for rendering these visual elements in a manner that shows the data (e.g., measures) as being categorized according to different attributes (e.g., dimensions) associated with the data. For example, the client device can render data for different regions of a map in the form of pie charts. The client device may render the pie charts so that data associated with different attribute values of an attribute are presented differently (e.g., different colors).

Also described herein are techniques for traversing hierarchical dimensions for dimension-based visual elements. In some embodiments, the possible attribute values of an attribute associated with data used for rendering the visual elements mentioned above can be defined as a hierarchy. The client device may render and present visual elements showing data associated with attribute values in a certain level of a hierarchy of attribute values defined for an attribute. A user of the client device can send the client device a request to provide visual elements that show data associated with attribute values in a different level of the hierarchy of attribute values defined for the attribute. In response to the request, the client device renders visual elements accordingly. The client device may handle similar requests for hierarchies of attribute values defined for different attributes. In this manner, the client device is able to provide visual elements that present different levels of granularity of data.

Figure 1:
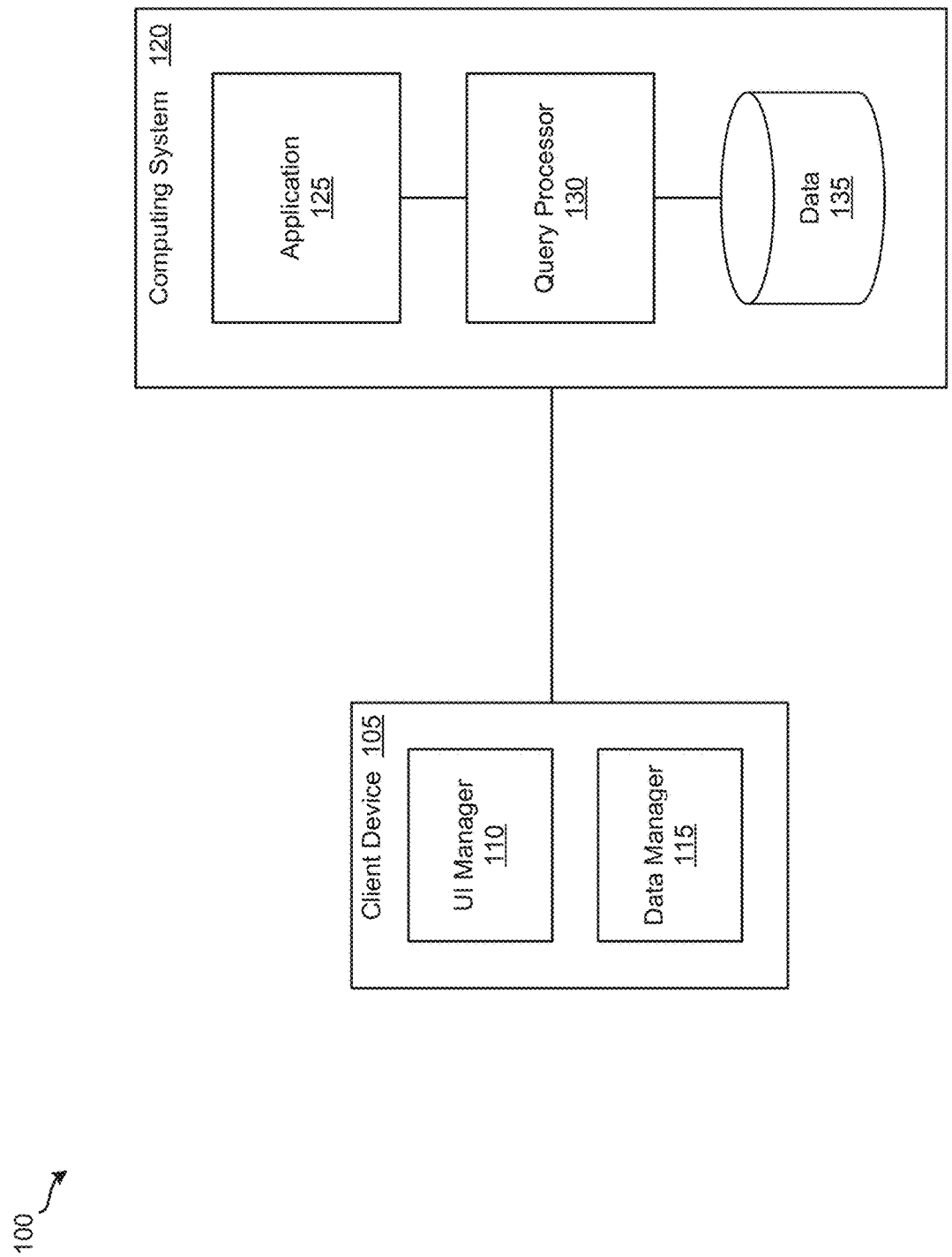
FIG. 1 illustrates a system for providing dimension-based visual elements according to some embodiments.

FIG. 1 illustrates a system 100 for providing dimension-based visual elements according to some embodiments. As shown, system 100 includes client device 105 and computer system 120. While FIG. 1 shows one client device 105, one of ordinary skill in the art will appreciate that any number of additional client devices configured the same as or similar to client device 105 may be included in system 100.

As illustrated in FIG. 1, client device 105 includes user interface (UI) manager 110 and data manager 115. UI manager 110 is responsible for managing UIs (e.g., graphical user interfaces (GUIs)) for client device 105. For example, UI manager 110 can access application 125 and provide GUIs (e.g., on a display of client device 105) for interacting with application 125. In some cases, UI manager 110 may receive from a user a request for a view of a map that includes data from a dataset managed by computing system 120. In response, UI manager 110 sends data manager 115 a request for the data. UI manager 110 also retrieves map data (e.g., a set of map tiles, a vector basemap) from a third-party map provider. UI manager 110 may receive from data manager 115 a data structure that includes the requested data. Based on the data structure and the map data, UI manager 110 renders a visualization that includes the view of the map and the requested data. Next, UI manager 110 presents the visualization (e.g., on a display of client device 105) for viewing.

Data manager 115 is configured to manage data for visualizations. For instance, data manager 115 may receive a request from UI manager 110 for data from a dataset managed by computing system 120. In response to receiving such a request, data manager 115 generates a query for the data and sends the query to computing system 120 (e.g., application 125). Once data manager 115 receives the requested data from computing system 120, data manager 115 may generate a data structure that stores the requested data in an optimized manner Data manager 115 then sends the data structure to UI manager 110.

As shown in FIG. 1, computing system 120 includes application 125, query processor 130, and data storage 135. Data storage 135 is configured to store datasets. In some embodiments, a dataset stored in data storage 135 is stored in one or more tables. Each table can include a set of fields. Each table may be configured to store one or more records and each record may store a value in each field in the set of fields. The set of fields may include one or more measures and/or one or more dimensions. In some embodiments, a measure is a field in the dataset that is configured to store quantitative (e.g., numeric) data and a dimension is a field in the dataset that is configured to store qualitative data. In some embodiments, a dimension is configured to categorize measures based on the dimension values of the dimension. Values stored in a measure can be referred to as measure values and values stored in dimensions can be referred to as dimension values. In addition, a dataset may include non-location data and location data associated with the non-location data. In some embodiments, location data can include address data, city data, state data, country data, postal zip code data, latitude and longitude data, etc., or a combination of any number of different types of location data (e.g., address data and city data, city data and state data, address data, etc.). Location data may be stored as a dimension. Non-location data can be stored as measures and/or dimensions. In some embodiments, data storage 135 is implemented in a single physical storage while, in other embodiments, data storage 135 may be implemented across several physical storages. While FIG. 1 shows data storage 135 as part of computing system 120, one of ordinary skill in the art will appreciate that data storage 135 may be external to computing system 120 in some embodiments.

Application 125 is software application operating on computing system 120. Application 115 may be any number of different types of applications. For instance, application 115 may be an analytics application, a data management application, a database management application, a human capital management application, an enterprise management application, a customer relationship management application, a financial management application, etc. Application 125 can communicate and interact with client device 105. For example, application 125 may receive from client device 105 a query for data from a data set stored in data storage 135. In response, application 125 forwards the query to query processor 130 for processing. When application 125 receives the results of the query from query processor 130, application 125 sends it to client device 105.

Query processor 130 is configured to process queries for data from datasets stored in data storage 135. For instance, query processor 130 may receive from application 125 a query for data from a dataset stored in data storage 135. Based on the query, query processor 130 accesses data storage 135, identifies the requested data in the dataset, and retrieves the data from the dataset. Query processor 130 then sends the retrieved data to application 125.

Figure 2:
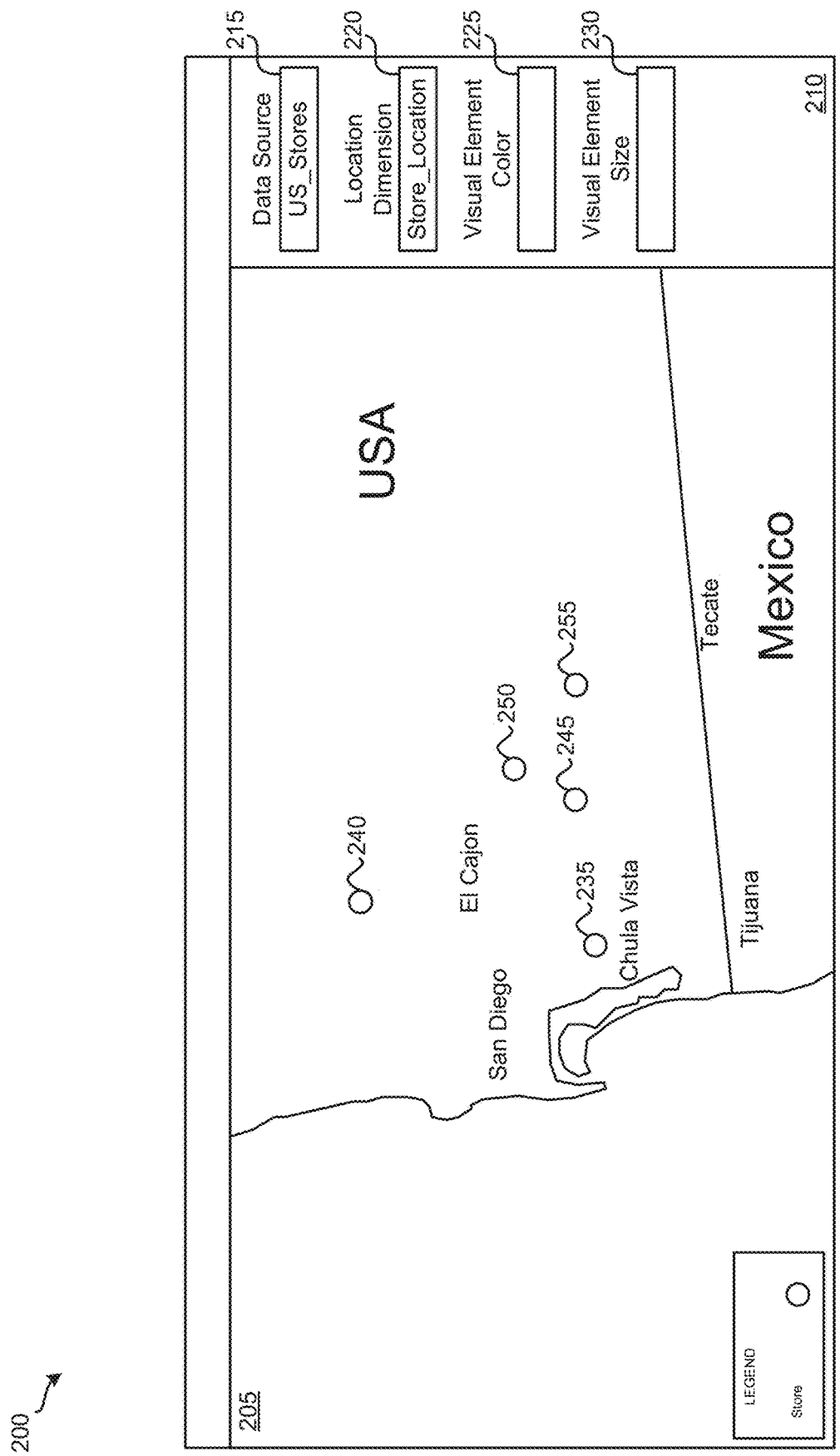
FIG. 2 illustrates an example view of a map showing store data according to some embodiments.

An example operations of system 100 will now be described by reference to FIGS. 1-7. Specifically, this example operation illustrates how system 100 provides dimension-based visual elements. For this operation, a user of client device 105 is currently accessing application 125 on computing system 120. FIG. 2 illustrates a GUI 200 through which the user of client device 105 is interacting with application 125. For this example, client device 105 provides GUI 200 on a display of client device 105. As shown, GUI 200 includes display area 205 and display area 210. Display area 205 is configured to display a visualization of a view of map that includes data from a dataset managed by computing system 120. Display area 210 includes user interface (UI) controls 215-230. UI control 215 is for specifying a data source and UI control 220 is for specifying a location dimension in the data source. UI control 225 is for specifying another dimension in the data source that is used to determine colors of visual elements. UI control 230 is for specifying a measure in the data source that is used to determine sizes of visual elements.

As shown in FIG. 2, the user of client device 105 has navigated to a view of a map shown in display area 205. In addition, the user of client device 105 has specified a dataset, which is stored in data storage 135, called US_Stores as the data source of the visualization displayed in display area 205. The user of client device 105 has also specified a location dimension in the dataset called Store_Location. In response to the user of client device 105 specifying the location dimension via UI control 220, UI manager 110 sends data manager 115 a request dimension values for the location dimension from the dataset. Then, UI manager 110 retrieves map data (e.g., a set of map tiles, a vector basemap) from a third-party map provider.

When data manager 115 receives the request from UI manager 110, data manager 115 generates a query for the data from the dataset and sends the query to application 125. Upon receiving the query, application 125 sends it to query processor 130. Based on the query, query processor 130 accesses data storage 135, identifies the dimension values for the location dimension in the US_Stores dataset, and retrieves the data from the dataset. Query processor 130 then sends the retrieved data to application 125, which forwards the data to data manager 115.

After data manager 115 receives the data from application 125, data manager 115 sends it to UI manager 110, which uses it to render a visualization and display the visualization in display area 205. FIG. 2 illustrates an example view of a map showing store data according to some embodiments. As shown in FIG. 2, the visualization includes a view of a map of the western part of the United States of America (USA) and Mexico. The visualization also includes points 235-255. For this example, the each dimension value for the Store_Location dimension in the requested data includes a set of latitude and longitude coordinates. Each of the points 235-255 represents a store and the location in the view of the map of the point is at the set of latitude and longitude coordinates.

Next, the user of client device 105 uses UI control 225 to specify a Product dimension in the US_Stores dataset and UI control 230 to specify a Gross Margin measure in the US_Stores dataset. In response to receiving this input data, UI manager 110 sends data manager 115 a request for the measure values for the Gross Margin measure categorized according to the Product dimension for each store location in the view of the map shown in display area 205 of FIG. 2. Upon receiving the request from UI manager 110, data manager 115 generates a query for the requested data from the US_Stores dataset and sends the query to application 125.

After application 125 receives the query, application 125 forwards the query to query processor 130 for processing. Based on the query, query processor 130 accesses data storage 135, identifies in the US_Stores dataset the measure values for the Gross Margin measure categorized according to the Product dimension for each store location in the view of the map, and retrieves the data from the dataset. Query processor 130 then sends the retrieved data to application 125 and application 125 forwards the data to data manager 115.

In this example, the data that data manager 115 receives from application 125 is structured in a flat manner FIG. 4 illustrates an example of such data. In particular, FIG. 4 illustrates example records in a set of data 400 according to some embodiments. As shown, set of data 400 includes four records 405-420. Each of the records 405-420 include a dimension value for the Product dimension, a measure value for the Gross Margin measure, and a set of latitude and longitude coordinates of the store location with which the dimension value and measure values are associated. For this example, records 405-420 are associated with the same store location since the set of latitude and longitude coordinates of records 405-420 are all the same.

For this example operation, data manager 115 generates a data structure that stores the data received from application 125 in a more optimized manner FIG. 5 illustrates an example data structure 500 generated based on the records illustrated in FIG. 4 according to some embodiments. As illustrated in FIG. 5, data structure 500 includes a single instance of the set of latitude and longitude coordinates of the store location as well as a sum of the measure values for the store location. Additionally, data structure 500 stores records 405-420 without the redundant location coordinates as parts 505-520 in data structure 500.

Figure 3:
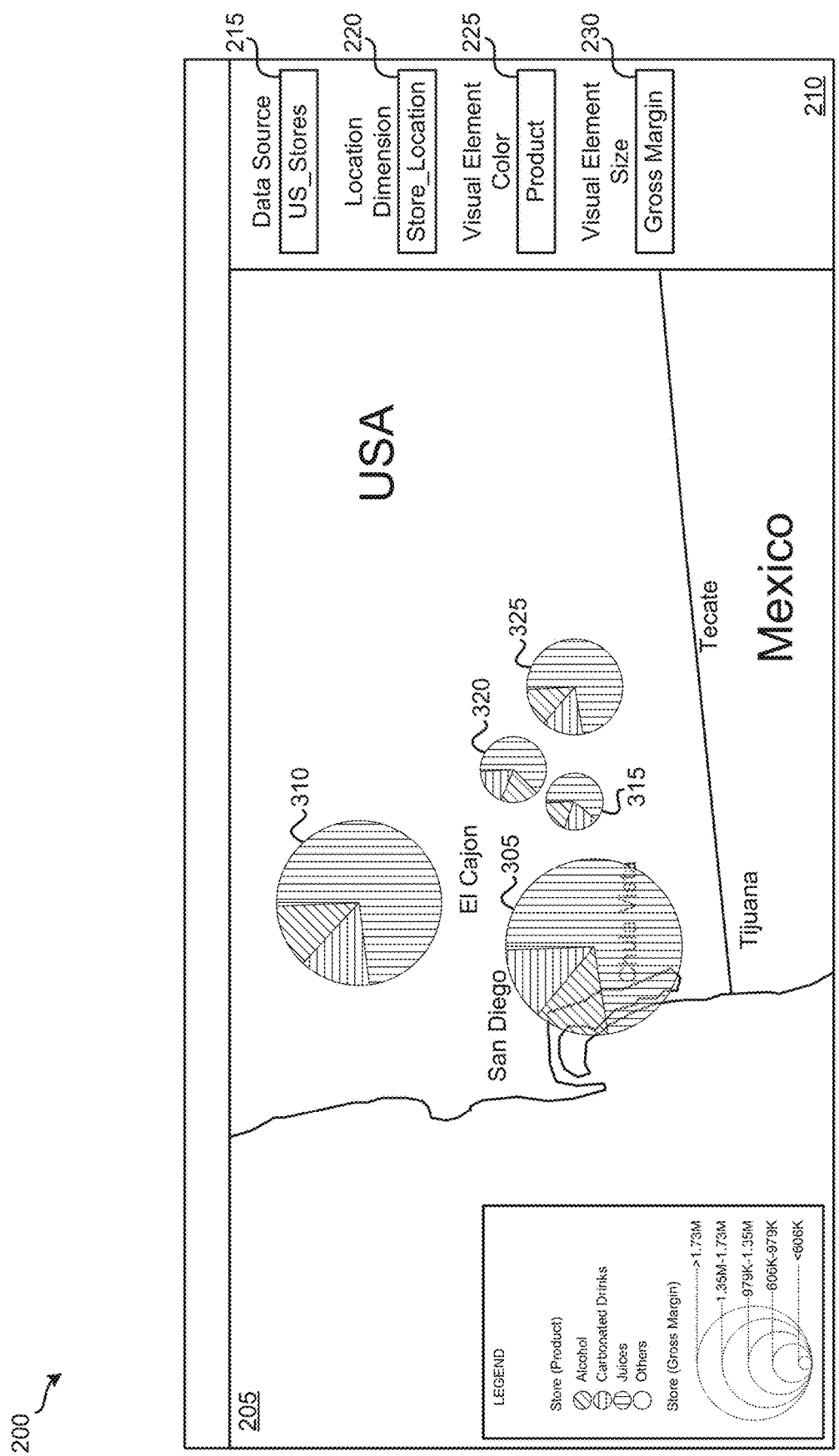
FIG. 3 illustrates the view of the map illustrated in FIG. 2 with dimension-based visual elements according to some embodiments.

Continuing with the example operation, after data manager 115 generates the data structure, data manager 115 sends it to UI manager 110. Based on the data structure and the map data (which was previously retrieved for rendering the visualization in FIG. 2), UI manager 110 renders a visualization that includes the view of the map and the requested data and displays it in display area 205. In this example, the visualization that UI manager 110 renders includes visual elements for the store locations. FIG. 3 illustrates the view of the map illustrated in FIG. 2 with dimension-based visual elements according to some embodiments. As illustrated in FIG. 3, display area 205 is displaying a visualization that includes the view of the map shown in FIG. 2. The visualization includes visual elements 305-325 instead of points 235-255. Each of the visual elements 305-325 is configured to present measure values for the Gross Margin measure at a particular store location and categorized according to the Product dimension. For this example, the dimension values of the Product dimension include Alcohol, Carbonated Drinks, Juices, and Others.

As shown, visual elements 305-325 are circular shapes. In this example, the circular shapes are pie charts. Each section (also referred to as a circular sector) in a circular shape represents a measure value for the Gross Margin measure that is associated with a dimension value for the Product dimension at a particular store location. Different sections for the different dimension values are indicated by different visual representations. For this example, a section associated with the Alcohol dimension value is indicated with diagonal lines, a section associated with the Carbonated Drinks dimension value is indicated with horizontal lines, a section associated with the Juices dimension value is indicated with vertical lines, and a section associated with the Others dimension value is indicated with no lines. One of ordinary skill in the art will understand that any number of different visual representations may be used in different embodiments. For instance, different sections for the different dimension values can be indicated by different colors. The area of a particular section in a pie may represent the magnitude of the measure value for the Gross Margin measure. The area of the circular shape can represent a sum of measure values for the Gross Margin measure at a particular store location. The size of the circular shape may represent the magnitude of the sum of the measure values. For example, larger circular shapes represent larger sums of measure values and smaller circular shapes represent smaller sums of measure values.

In some embodiments, the visual elements that UI manager 110 renders each includes two elements: a visible element and an invisible element. The visible element may be configured to present the set of measure values of the measure associated with the location in the set of locations and categorized according to the dimension, as illustrated by visual elements 305-325, for example. In some embodiments, the visible element of each visual element is a scalable vector graphic (SVG) that cannot detect or receive input. As such, the invisible element can be configured to receive input for interacting with the visual element. The invisible element of a visual element may be rendered over the visible element of the visual element. This way, the invisible element of a visual element can detect and capture input received over the visual element.

Figure 6:
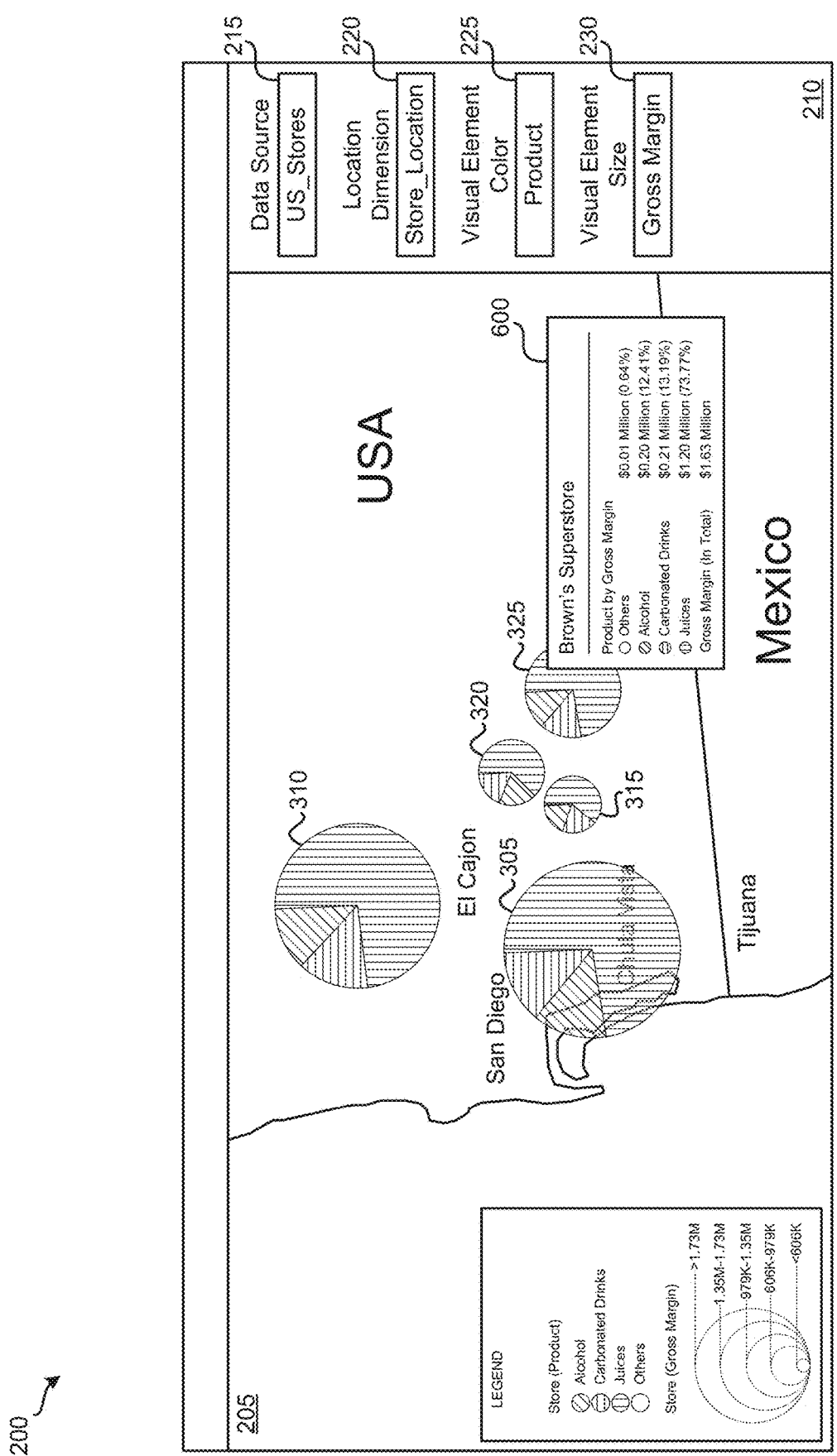
FIG. 6 illustrates a feature for providing information associated with a visual element according to some embodiments.

Client device 105 can provide a feature for providing the measure and dimension data associated with a particular visual element (e.g., store location) in a popup display area in some embodiments. For instance, when UI manager 110 detects, via the invisible element of a visual element, a GUI pointer hovering over the visual element for a defined threshold amount of time, UI manager 110 renders a popup display area for the visual element and provides it in display area 205. The popup display area may include a table that presents the set of measure values for the measure associated with a store location and categorized according to the dimension. FIG. 6 illustrates a feature for providing information associated with a visual element according to some embodiments. Specifically, FIG. 6 illustrates a popup display area 600 that UI manager 110 superimposes over the visual elements 305-325 and the view of the map. In this example, UI manager 110 detected a GUI pointer (not shown) hovering over visual element 325 for the defined threshold amount of time. In response, UI manager 110 rendered popup display area 600 and provided it adjacent to visual element 325 in display area 205 in the aforementioned manner. As shown, popup display area 600 includes a table that is presenting the measure values for the Gross Margin measure associated with Brown's Superstore store location and categorized according to the Product dimension.

In some embodiments, client device 105 may provide a feature for providing the measure and dimension data associated with a portion of a particular visual element (e.g., store location) in a popup display area. For example, UI manager 110 can receive a selection of a circular section of a visual element, which UI manager 110 detects through the invisible element of the visual element. In response to receiving the selection, UI manager 110 renders a popup display area for the selected circular section of the visual element and provides it in display area 205. The popup display area may include a table that presents the measure value for the measure that is associated with the dimension value represented by the selected circular section.

To determine which circular section is selected, when UI manager 110 renders visual elements in a visualization, UI manager 110 stores the location of the center of visual elements as well as the relative range of angles about the center of the visual element occupied by each circular section of the visual element. For example, a circular section that occupies the top right quarter of a visual element has a relative range of angles of 0 to 90 degrees, a circular section that occupies the bottom half of a visual element has a relative range of angles of 90 to 270 degrees, a circular section that occupies the top left third of a visual element has a relative range of angles of 240 to 360 degrees, etc. Upon detecting, via the invisible element of a visual element, a selection of a location on the visual element, UI manager 110 determines the set of coordinates (e.g., a set of display coordinates) of the location. Then, UI manager 110 determines the set of coordinates (e.g., a set of display coordinates) of the location of the center of the visual element. Next, UI manager 110 determines an angle between a vertical line formed by the top of the visual element and center of the visual element and a line formed by the selected location and the center of the visual element. Based on the determined angle, UI manager 110 determines which circular section in the visual element is selected. Then, UI manager 110 generating a new visual element that includes the selected circular section highlighted. UI manager 110 replaces the visual element in the visualization with the new visual element.

Figure 7:
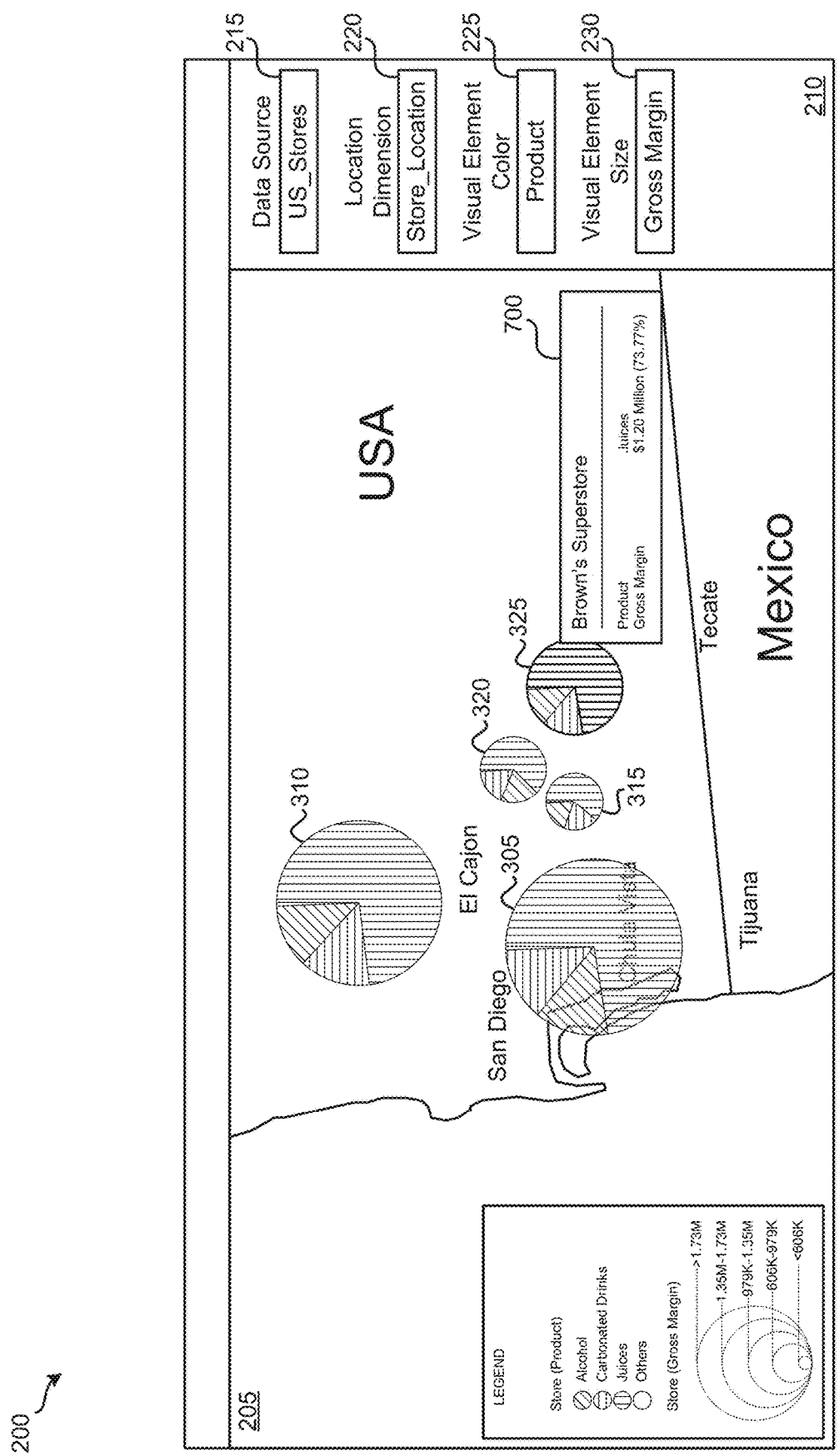
FIG. 7 illustrates a feature for providing information associated with a section of a visual element according to some embodiments.

FIG. 7 illustrates a feature for providing information associated with a section of a visual element according to some embodiments. In particular, FIG. 7 illustrates a popup display area 700 that UI manager 110 superimposes over the visual elements 305-325 and the view of the map. For this example, UI manager 110 detected a selection of the circular section in visual element 325 representing Juices. In response, UI manager 110 rendered a new visual element for visual element 325 that includes the selected circular section highlighted and replaced visual element 325 with the new visual element. Also, UI manager 110 rendered popup display area 700 and provided it adjacent to the selected circular section of visual element 325 in display area 205 in the manner explained above. As illustrated, popup display area 700 includes a table that is presenting the measure value for the Gross Margin measure associated with the Juices dimension value for the Brown's Superstore store location.

Figure 8:
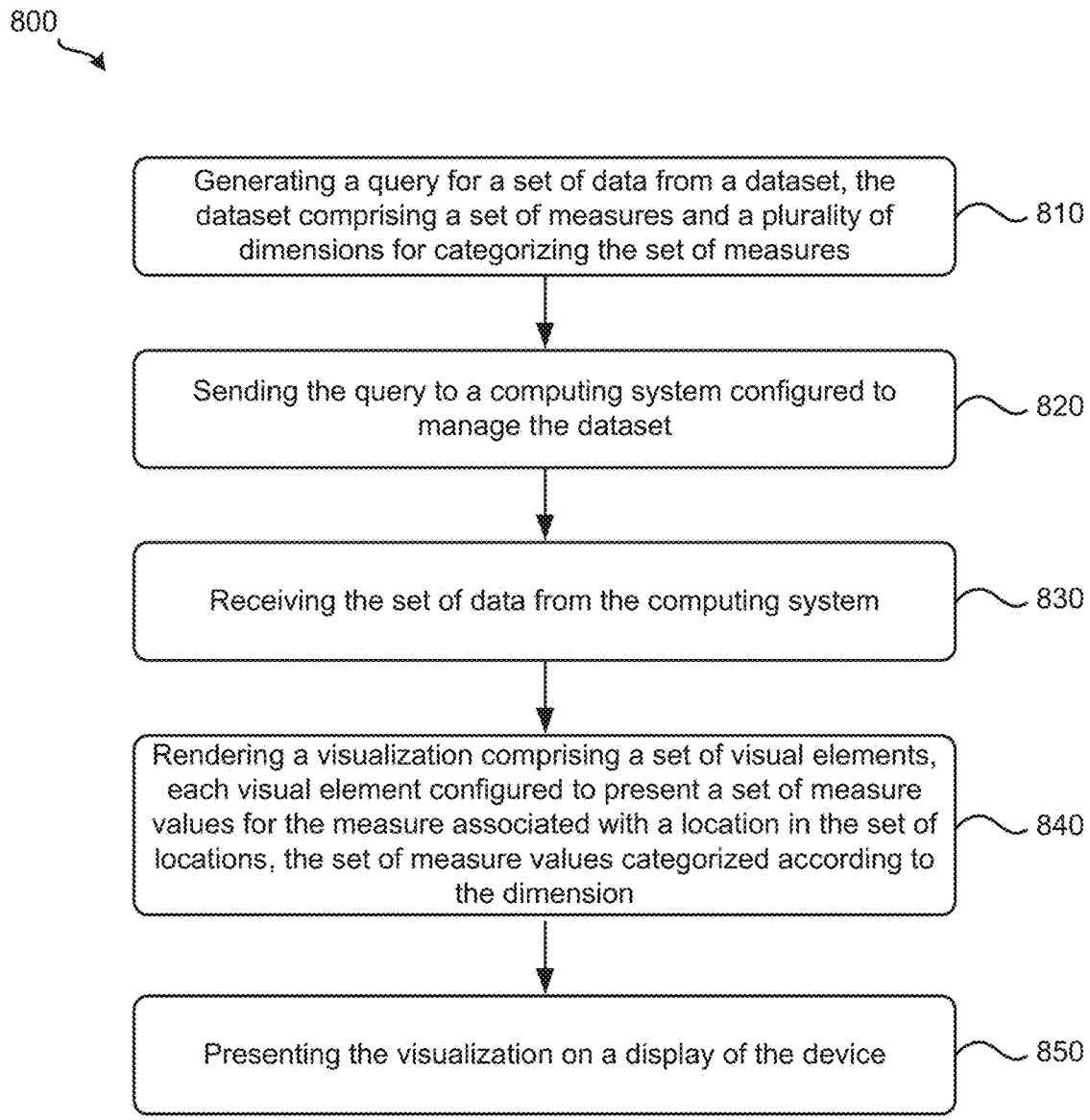
FIG. 8 illustrates a process for providing dimension-based visual elements according to some embodiments.

FIG. 8 illustrates a process 800 for providing dimension-based visual elements according to some embodiments. In some embodiments, client device 105 performs process 800. Process 800 starts by generating, at 810, a query for a set of data from a dataset. The dataset comprises a set of measures and a plurality of dimensions for categorizing the set of measures. The set of data comprises a set of locations and measure values for a measure in the set of measures categorized according to a dimension in the plurality of dimensions. Referring to FIG. 1 as an example, data manager 115 may generate the query for the set of data from a dataset. Data manager 115 generates the query in response to receiving a request for the set of data from UI manager 110.

Next, process 800 sends, at 820, the query to a computing system configured to manage the dataset. Referring to FIG. 1 as an example, data manager 115 can send the query to computing system 120, which manages the dataset stored in data storage 135. Process 800 then receives, at 830, the set of data from the computing system. Referring to FIG. 1 as an example, data manager 115 receives the set of data from computing system 120. Data manager 115 then sends the set of data to UI manager 110.

At 840, process 800 renders a visualization comprising a set of visual elements. Each visual element is configured to present a set of measure values for the measure associated with a location in the set of locations. The set of measure values are categorized according to the dimension. Referring to FIGS. 1 and 3 as an example, UI manager 110 can render the visualization illustrated in display area 205. As shown in FIG. 3, the visualization includes visual elements 305-325. Each of the visual elements 305-325 presents a set of measure values for the Gross Margin measure associated with the store location. The set of measure values of each of the visual elements 305-325 are categorized according to the Product dimension. Finally, process 800 presents, at 850, the visualization on a display of the device. Referring to FIGS. 1 and 3 as an example, UI manager 110 presents the visualization in display area 205 on a display of client device 105.

As mentioned above, techniques for traversing hierarchical dimensions for dimension-based visual elements are described herein. The following example operation of system 100 described by reference to FIGS. 9-18 will illustrates such techniques. Similar to the example operation described above, in this operation, a user of client device 105 is currently accessing application 125 on computing system 120 and interacting with application 125 via GUI 200. In addition, the user of client device 105 specifies the same US_Stores dataset as the data source, Store_Location dimension as the location dimension, the Product dimension in the US_Stores dataset that is used to determine colors of visual elements, and the Gross Margin measure that is used to determine sizes of visual elements. However, in this example, a hierarchy of dimension values is defined for the Product dimension and a hierarchy of dimension values is defined for the Store_Location dimension.

Figure 9:
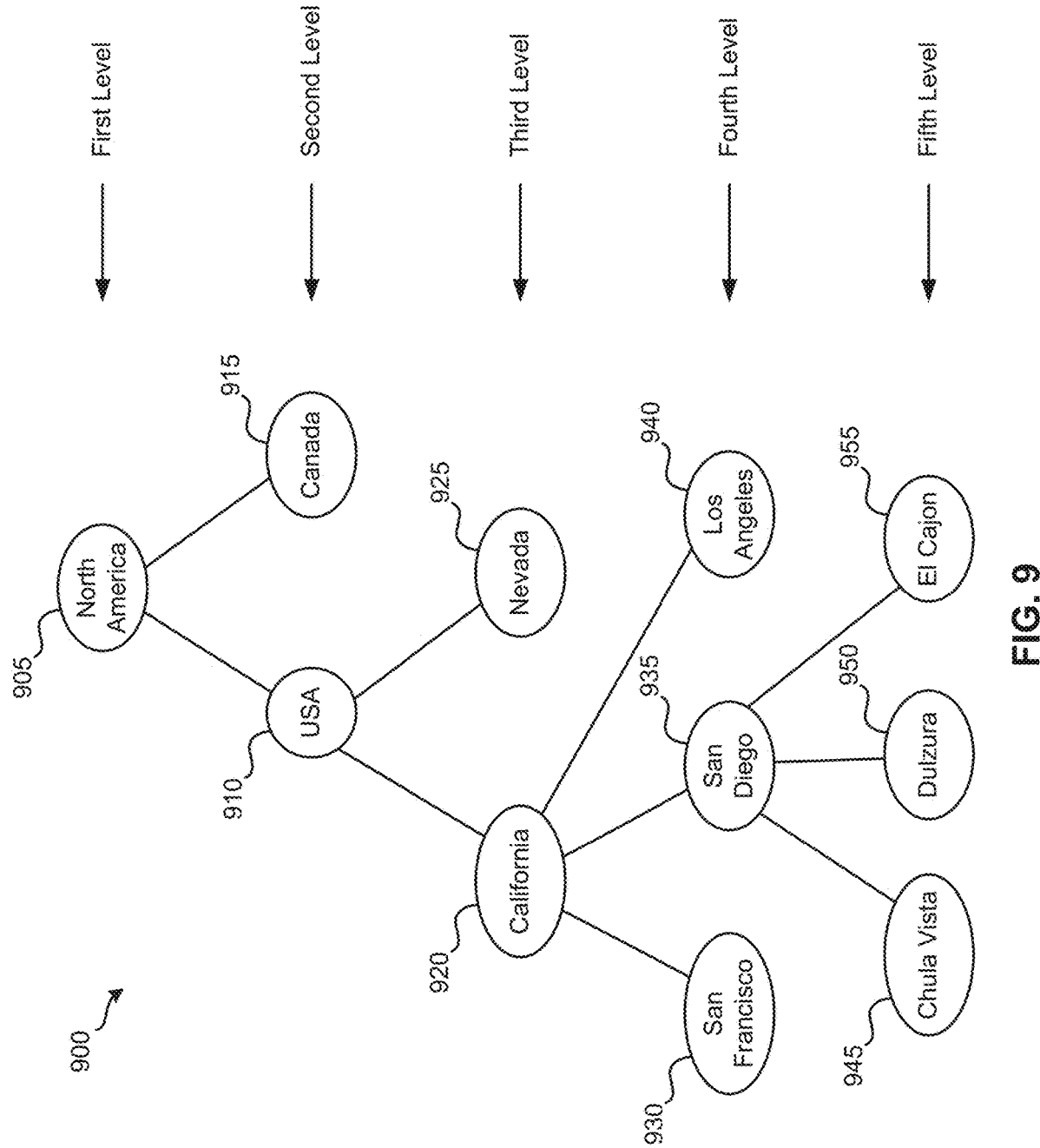
FIG. 9 illustrates an example hierarchy of dimension values for a location dimension according to some embodiments.

FIG. 9 illustrates an example hierarchy of dimension values 900 for a location dimension according to some embodiments. Specifically, hierarchy of dimension values 900 is defined for the Store_Location dimension in this example. As shown, hierarchy of dimension values 900 includes nodes 905-955 organized in five different levels of the hierarchy of dimension values 900. The nodes 905-955 represent different geographical areas and/or regions. Each child node represents a sub-area or sub-region in a region represented by the parent node In this example, nodes at the first level of the hierarchy of dimension values 900 represent continents, nodes at the second level of the hierarchy of dimension values 900 represent countries, nodes at the third level of the hierarchy of dimension values 900 represent states, nodes at the fourth level of the hierarchy of dimension values 900 represent counties, and nodes at the fifth level of the hierarchy of dimension values 900 represent cities.

As illustrated in FIG. 9, node 905 represents the continent of North America. Nodes 910 and 915 represent the countries of USA and Canada, respectively. Nodes 920 and 925 represent the states of California and Nevada, respectively, in the country of USA. Nodes 930-940 represent the counties of San Francisco, San Diego, and Los Angeles, respectively, in the state of California. Lastly, nodes 945-955 represent the cities of Chula Vista, Dulzura, and El Cajon, respectively, in the county of San Diego.

Figure 10:
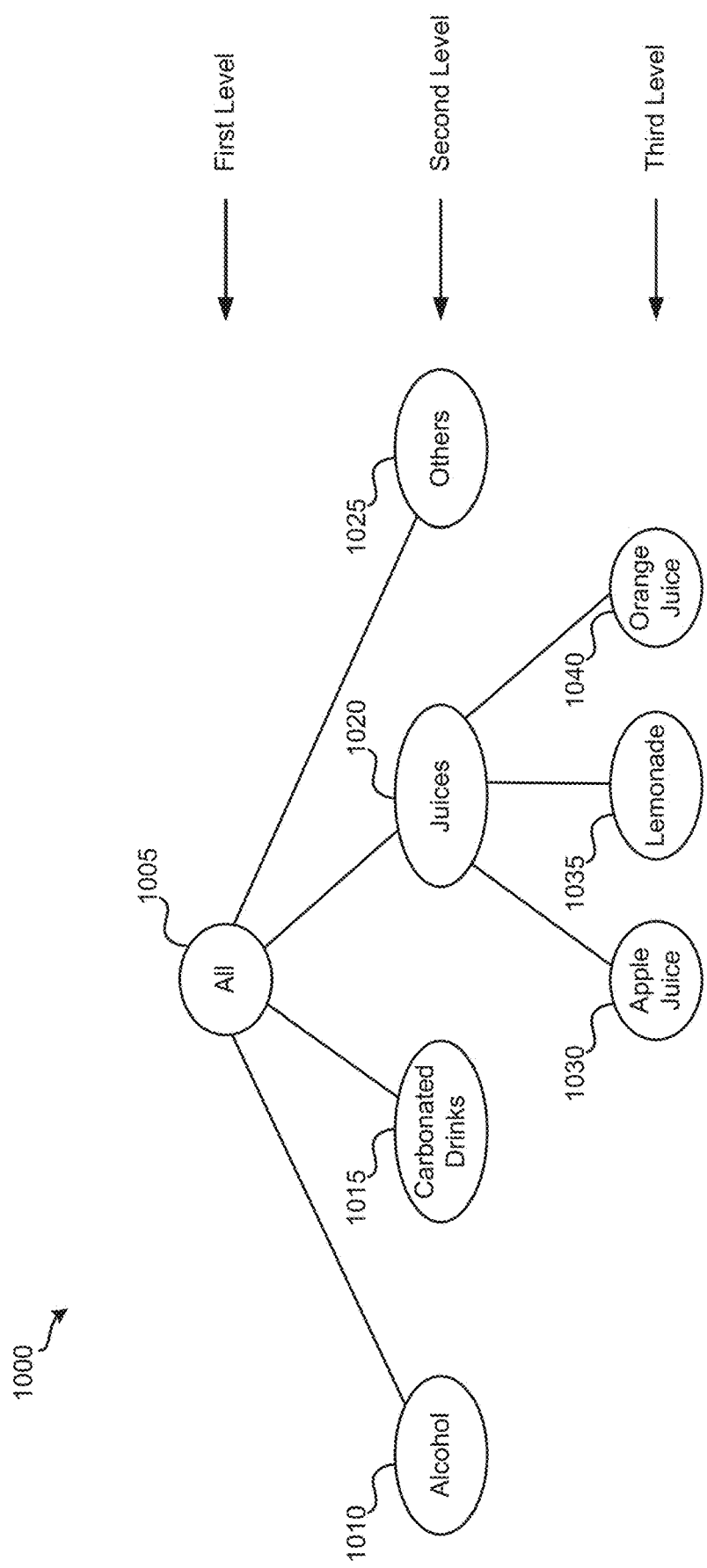
FIG. 10 illustrates an example hierarchy of dimension values for a product dimension according to some embodiments.

FIG. 10 illustrates an example hierarchy of dimension values 1000 for a product dimension according to some embodiments. In particular, hierarchy of dimension values 1000 is defined for the Product dimension for this example. As illustrated in FIG. 10, hierarchy of dimension values 1000 includes nodes 1005-1040 organized in three different levels of the hierarchy of dimension values 1000. The nodes 1005-1040 represent different a category of products. Each child node represents a sub-category of the category represented by the parent node For this example, the node at the first level of the hierarchy of dimension values 1000 represent all products, nodes at the second level of the hierarchy of dimension values 1000 represent a category of beverages, and nodes at the third level of the hierarchy of dimension values 1000 represent a sub-category of beverages. As shown in FIG. 10, node 1005 represents all products. Nodes 1010-1025 represent the beverage categories of Alcohol, Carbonated Drinks, Juices, and Others. Nodes 1030-1040 represent the sub-categories of Apple Juice, Lemonade, and Orange Juice of the beverage category of Juices.

Returning to the operation, the user of client device 105 sent client device 105 a request for a visualization that includes a view of a map that shows measure values for the Gross Margin measure categorized according to dimension values in the fourth level of the hierarchy of dimension values 900 defined for the Store_Location dimension and dimension values in the second level of the hierarchy of dimension values 1000 defined for the Product dimension.

When UI manager 110 receives the request from the user, UI manager 110 sends a request for the data to data manager 115. Next, data manager 115 generates a query for the requested data from the US_Stores dataset and sends the query to application 125.

Upon receiving the query, application 125 forwards it to query processor 130 for processing. Based on the query, query processor 130 accesses data storage 135, identifies in the US_Stores dataset the measure values for the Gross Margin measure categorized according to dimension values in the fourth level of the hierarchy of dimension values 900 defined for the Store_Location dimension and dimension values in the second level of the hierarchy of dimension values 1000 defined for the Product dimension. Next, query processor 130 sends the retrieved data to application 125, which forwards it to data manager 115.

The data that data manager 115 receives from application 125 is structured in a similar flat manner as that described above by reference to FIG. 4. As such, data manager 115 generates a data structure that stores the data received from application 125 in a more optimized manner similar to that described above by reference to FIG. 5. Data manager 115 then sends the generated data structure to UI manager 110. Next, UI manager 110 retrieves map data (e.g., a set of map tiles, a vector basemap) from a third-party map provider for the view of the map. Based on the data structure and the map data, UI manager 110 renders a visualization that includes the view of the map and the requested data and displays it in display area 205.

Figure 11:
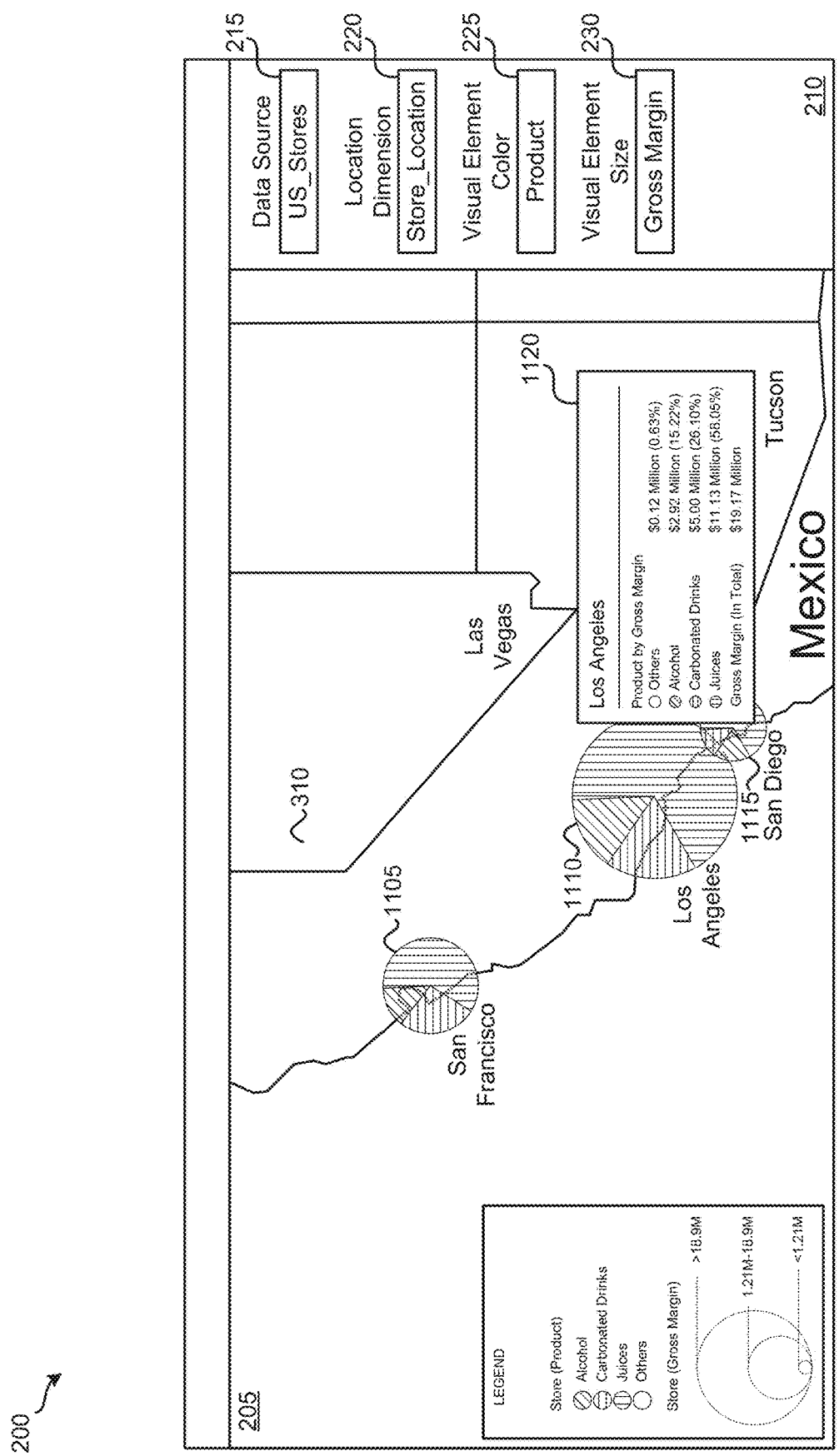
FIG. 11 illustrates another example view of a map showing county data according to some embodiments.

For this example, UI manager 110 also renders in the visualization visual elements for the county regions. FIG. 11 illustrates another example view of a map showing county data according to some embodiments. Specifically, FIG. 11 illustrates the visualization that UI manager 110 rendered in this example and displayed in display area 205. As shown in FIG. 11, display area 205 is displaying a visualization that includes a view of a map showing the state of California as well as visual elements 1105-1115. UI manager 110 rendered a visible element and an invisible element for each of the visual elements 1105-1115 in the same or similar manner described above. Each of the visual elements 1105-1115 is configured to present measure values for the Gross Margin measure for a particular county in the hierarchy of dimension values 900 and categorized according to dimension values in the second level of the hierarchy of dimension values 1000 defined for the Product dimension. In this example, the dimension values in the second level of the hierarchy of dimension values 1000 include Alcohol, Carbonated Drinks, Juices, and Others. In this example, UI manager 110 also detects, via the invisible element of visual element 1110, a GUI pointer hovering over visual element 1110 for a defined threshold amount of time. In response, UI manager 110 rendered popup display area 1120 for visual element 1110 and provided it adjacent to visual element 1110 in display area 205 (e.g., by superimposing popup display area 1120 over the visual elements 1110 and 1115 and the view of the map). As shown, popup display area 1120 includes a table that is presenting the measure values for the Gross Margin measure associated with the county of Los Angeles and categorized according to dimension values in the second level of the hierarchy of dimension values 1000 defined for the Product dimension.

Figure 12:
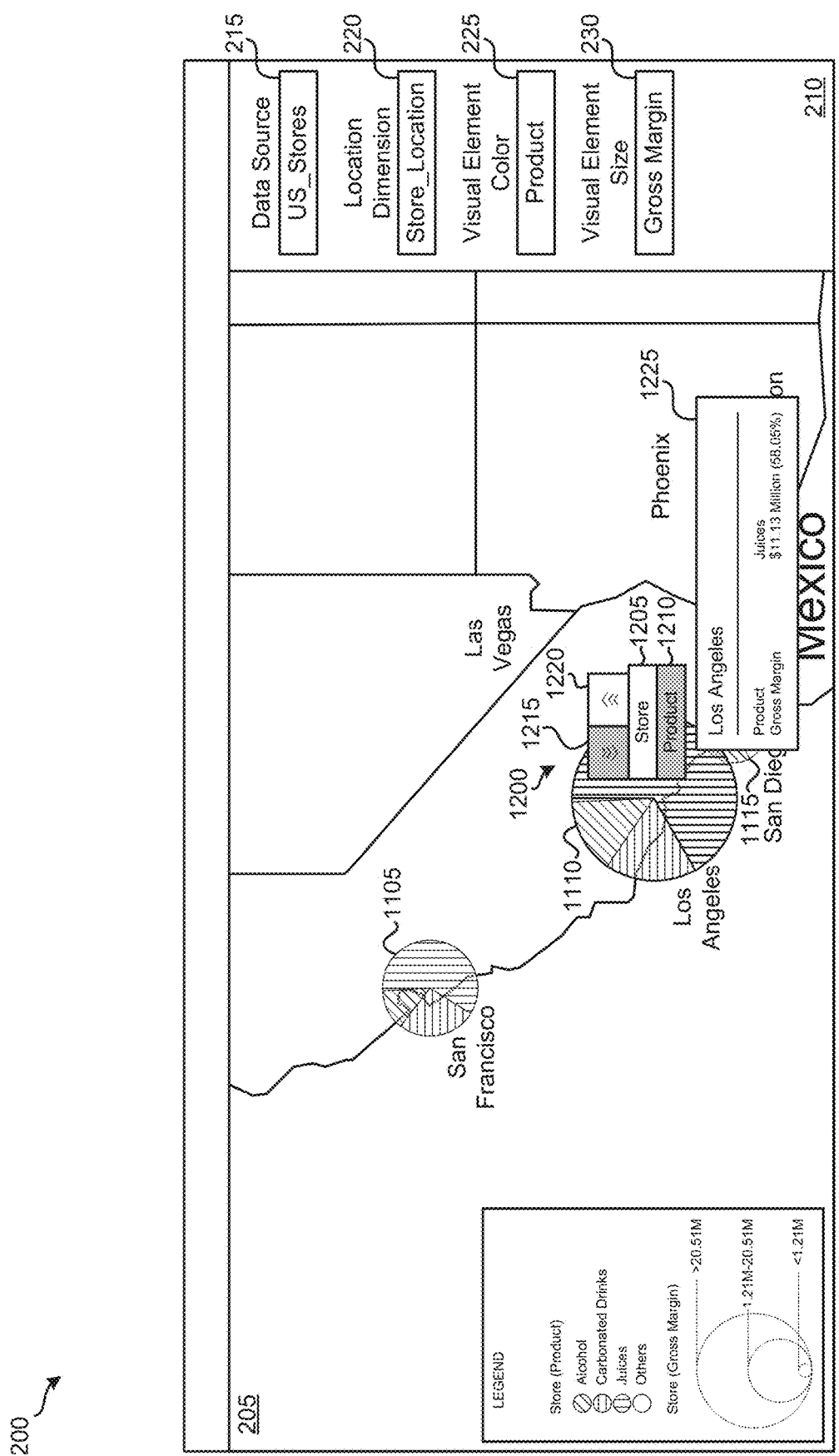
FIG. 12 illustrates a feature for requesting lower level dimension values according to some embodiments.

Continuing with the example operation, the user of client device 105 selects the circular section of visual element 1110 associated with the Juices dimension value. UI manager 110 determines that the circular section of visual element 1110 associated with the Juices dimension value is selected in a similar manner previously explained above. FIG. 12 illustrates GUI 200 after the user of client device 105 selected the circular section. For this example, in response to receiving the selection, UI manager 110 replaced visual element 1110 with a new visual element that includes the selected section highlighted, as shown in FIG. 12. UI manager 110 also rendered popup display area 1225 for the selected circular section of visual element 1110 and provided it in display area 205. Popup display area 1225 includes a table that presents the measure value for the measure that is associated with the Juices dimension value.

FIG. 12 also illustrates a feature for requesting lower level dimension values according to some embodiments. As illustrated, display area 205 is displaying tool 1200. UI manager 110 provided tool 1200 in display area 205 in response to detecting input (e.g., a right-click, a hotkey, a keyboard shortcut, etc.) while a GUI pointer was on the circular section of visual element 1110 associated with the Juices dimension value. As shown, tool 1200 includes selectable UI items 1205-1220. UI item 1205, when selected, is for selecting hierarchy of dimension values 900. UI item 1210, when selected, is for selecting hierarchy of dimension values 1000. UI item 1215 is for selecting dimension values one level lower than the current selected level in a hierarchy of dimension values selected with UI item 1205 or 1210. UI item 1220 is for selecting dimension values one level higher than the current selected level in a hierarchy of dimension values selected with UI item 1205 or 1210. In this example, the user of client device selected UI item 1210, as indicated by a highlighting of UI item 1210, to select hierarchy of dimension values 1000. In addition, the user of client device 105 selected UI item 1215, as indicated by a highlighting of UI item 1215, in order to select dimension values one level lower than the current selected level in hierarchy of dimension values 1000. The current selected level in the hierarchy of dimension values 900 is the fourth level and the current selected level in the hierarchy of dimension values 1000 is the second level. Therefore, in response to receiving the selection of UI item 1215, UI manager 110 sends data manager 115 a request for measure values for the Gross Margin measure categorized according to dimension values in the fourth level of the hierarchy of dimension values 900 defined for the Store_Location dimension and dimension values in the third level of the hierarchy of dimension values 1000 defined for the Product dimension.

Then, data manager 115 generates a query for the requested data from the US_Stores dataset and sends the query to application 125, which forwards it to query processor 130 for processing. Based on the query, query processor 130 accesses data storage 135, identifies in the US_Stores dataset the measure values for the Gross Margin measure categorized according to dimension values in the fourth level of the hierarchy of dimension values 900 defined for the Store_Location dimension and dimension values in the third level of the hierarchy of dimension values 1000 defined for the Product dimension. Query processor 130 then sends the retrieved data to application 125, which forwards it to data manager 115.

The data that data manager 115 receives from application 125 is structured in a similar flat manner as that described above by reference to FIG. 4. Thus, data manager 115 generates a data structure that stores the data received from application 125 in a more optimized manner similar to that described above by reference to FIG. 5. Next, data manager 115 sends the generated data structure to UI manager 110. Based on the data structure and the map data (which was previously retrieved for rendering the visualization in FIG. 12), UI manager 110 renders a visualization that includes the view of the map and the requested data and displays it in display area 205. UI manager 110 also renders in the visualization visual elements for the county regions. However, the visual elements that UI manager 110 render at this stage of the operation are configured to present measure values for the Gross Margin measure for a particular c in the hierarchy of dimension values 900 and categorized according to dimension values in the third level of the hierarchy of dimension values 1000 defined for the Product dimension.

Figure 13:
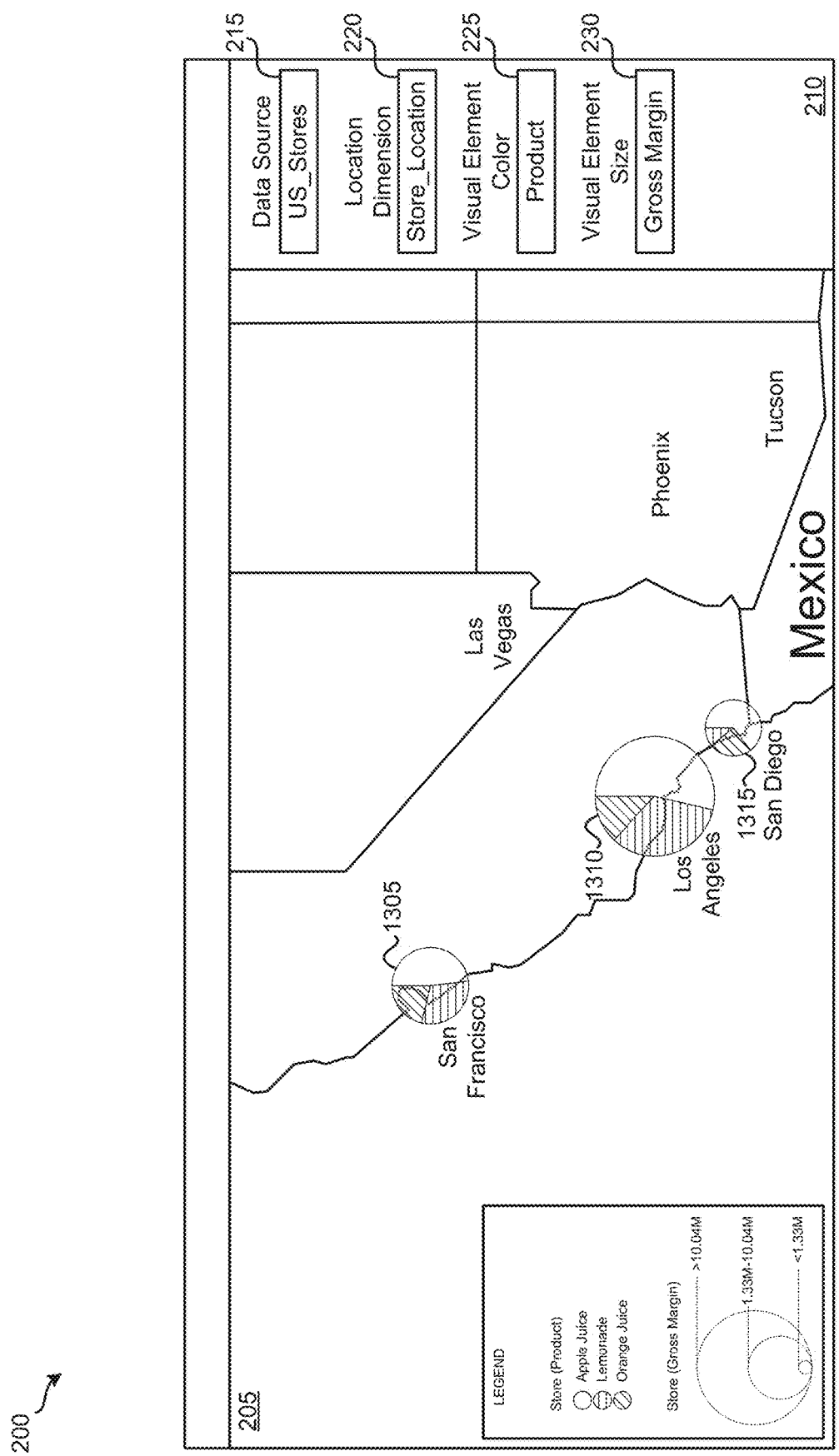
FIG. 13 illustrates an example of providing dimension-based visual elements using lower level dimension values according to some embodiments.

FIG. 13 illustrates an example of providing dimension-based visual elements using lower level dimension values according to some embodiments. Specifically, FIG. 13 illustrates GUI 200 after the user of client device selected UI item 1215 in tool 1200 shown in FIG. 12 and UI manager 110 has, in response, rendered and provided the visualization in display area 205. As illustrated in FIG. 13, display area 205 is displaying a visualization that includes the same view of the map as that shown in FIG. 12. Instead of visual elements 1105-1115, the visualization shown in FIG. 13 includes visual elements 1305-1315. UI manager 110 rendered a visible element and an invisible element for each of the visual elements 1305-1315 in the same or similar manner explained above. Each of the visual elements 1305-1315 is configured to present measure values for the Gross Margin measure for a particular county in the hierarchy of dimension values 900 and categorized according to dimension values in the third level of the hierarchy of dimension values 1000 defined for the Product dimension. For this example, the dimension values in the third level of the hierarchy of dimension values 1000 include Apple Juice, Lemonade, and Orange Juice.

Figure 14:
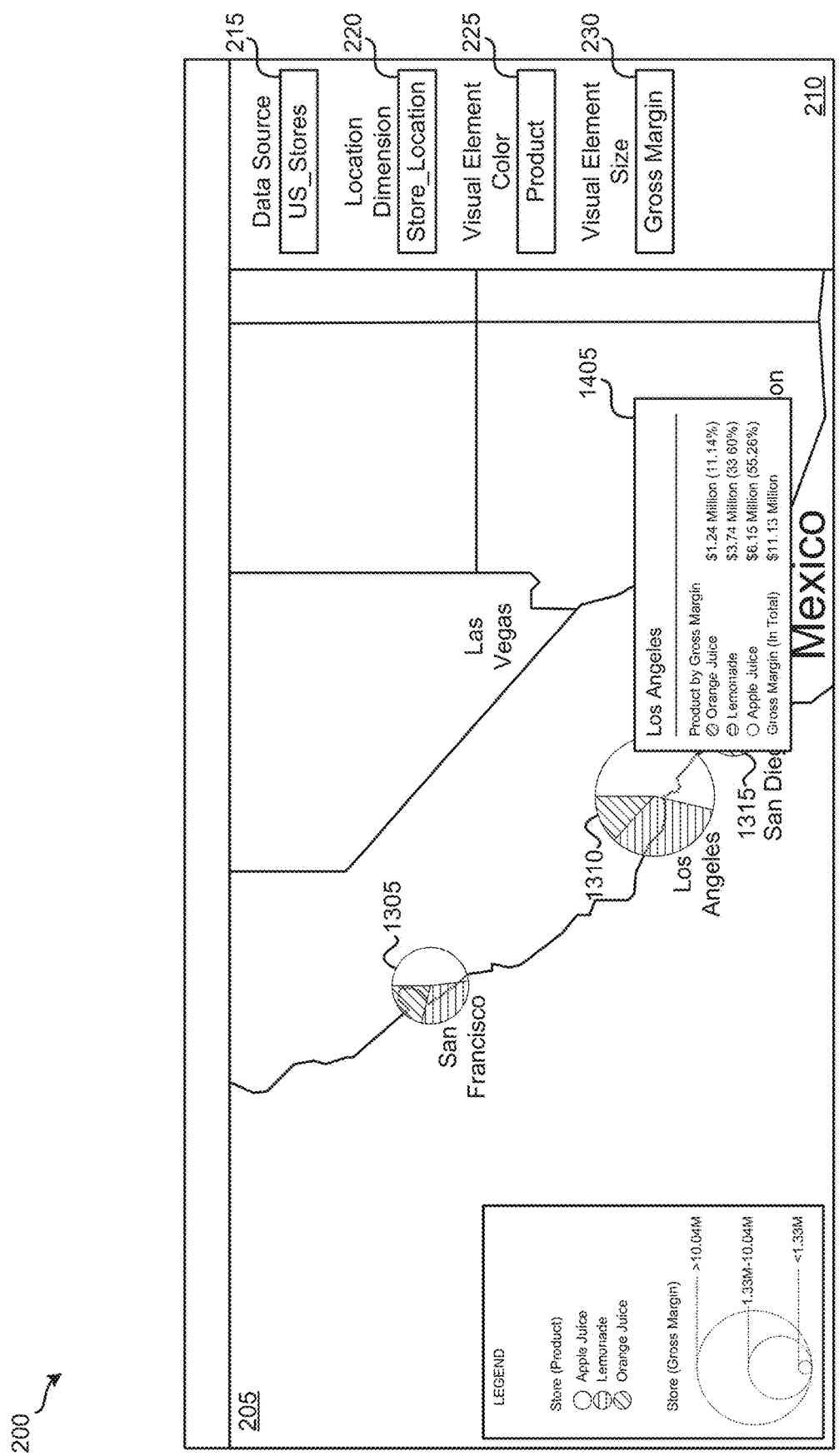
FIG. 14 illustrates a feature for providing information associated with a visual element according to some embodiments.

Continuing with the operation, the user of client device 105 hovers a GUI pointer over visual element 1310 for a defined threshold amount of time. FIG. 14 illustrates a feature for providing information associated with a visual element according to some embodiments. In particular, FIG. 14 illustrates GUI 200 after UI manager 110 detects, via the invisible element of visual element 1310, the hovering of the GUI pointer over visual element 1310 for the defined threshold amount of time. In response to the detection, UI manager 110 renders popup display area 1405 for visual element 1310 and provides it adjacent to visual element 1310 in display area 205 (e.g., by superimposing popup display area 1405 over the visual elements 1310 and 1315 and the view of the map). As illustrated in FIG. 14, popup display area 1405 includes a table that is presenting the measure values for the Gross Margin measure associated with the county of Los Angeles and categorized according to dimension values in the third level of the hierarchy of dimension values 1000 defined for the Product dimension.

Instead of selecting the circular section in visual element 1110 associated with the Juice dimension value and selecting to view measure values for the Gross Margin measure associated with the county of Los Angeles and categorized according to a lower level of dimension values in the hierarchy of dimension values 1000 defined for the Product dimension (i.e., drilling down on the hierarchy of dimension values 1000 from the Juices dimension value), the user of client device 105 may select to view measure values for the Gross Margin measure associated with a lower level of dimension values in the hierarchy of dimension values 900 defined for the Store_Location dimension.

Figure 15:
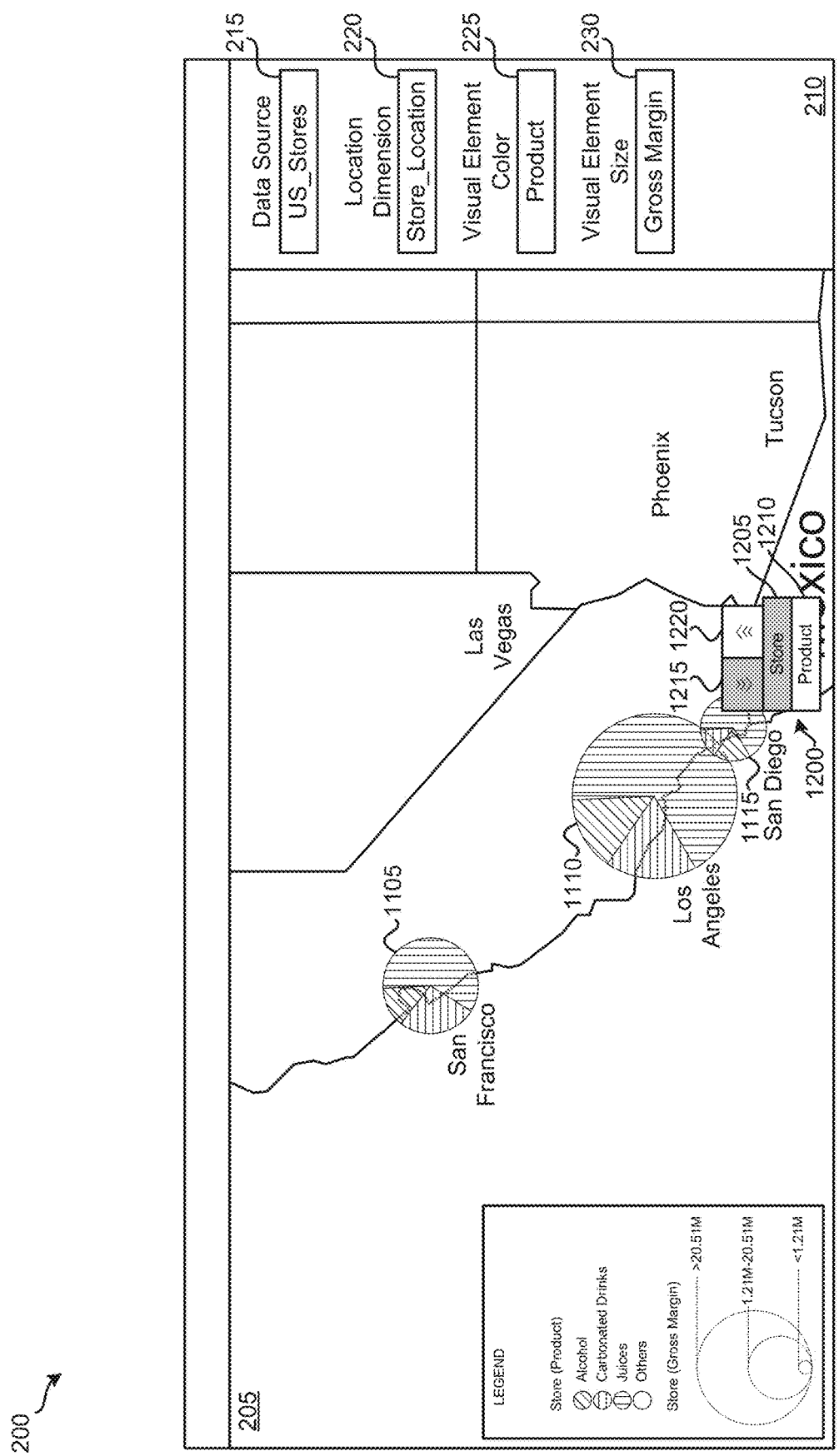
FIG. 15 illustrates a feature for requesting lower level dimension values according to some embodiments.

FIG. 15 illustrates a feature for requesting lower level dimension values according to some embodiments. In particular, FIG. 15 illustrates GUI 200 after the user of client device 105 select to view measure values for the Gross Margin measure associated with a lower level of dimension values in the hierarchy of dimension values 900 defined for the Store_Location dimension. For this example, the user of client device 105 provided input (e.g., a right-click, a hotkey, a keyboard shortcut, etc.) while a GUI pointer was on visual element 1115 to enable tool 1200. Upon detecting this input, UI manager 110 provided tool 1200 adjacent to visual element 1115 in display area 205. As shown in FIG. 15, the user of client device 105 has selected UI item 1205, as indicated by a highlighting of UI item 1205, to select hierarchy of dimension values 900. The user of client device 105 has also selected UI item 1215, as indicated by a highlighting of UI item 1215, to select dimension values one level lower than the current selected level in hierarchy of dimension values 900.

Figure 16:
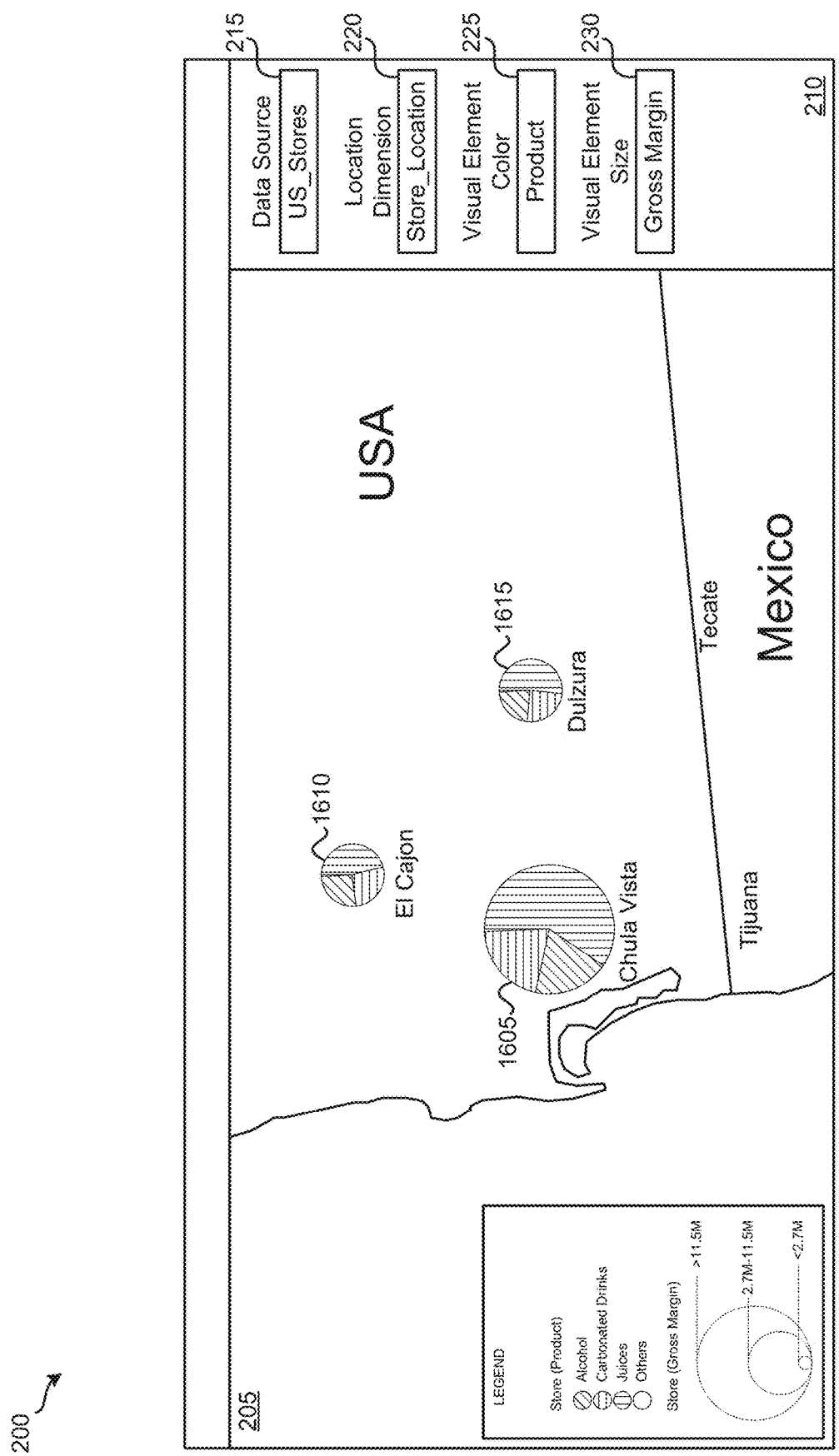
FIG. 16 illustrates another example view of a map showing city data according to some embodiments.

FIG. 16 illustrates another example view of a map showing city data according to some embodiments. Specifically, FIG. 16 illustrates a view of a map that is similar to the one illustrated in FIG. 2. As shown, display area 205 is presenting a visualization that includes visual elements 1605-1615. For this example, when UI manager 110 receives the selection of UI item 1215, UI manager 110 UI manager 110 sends data manager 115 a request for measure values for the Gross Margin measure categorized according to dimension values in the fifth level of the hierarchy of dimension values 900 defined for the Store_Location dimension and dimension values in the second level of the hierarchy of dimension values 1000 defined for the Product dimension. In response to the request, data manager 115 generates a query for the requested data from the US_Stores dataset and sends the query to application 125, which forwards it to query processor 130 for processing. Based on the query, query processor 130 accesses data storage 135, identifies in the US_Stores dataset the measure values for the Gross Margin measure categorized according to dimension values in the fifth level of the hierarchy of dimension values 900 defined for the Store_Location dimension and dimension values in the second level of the hierarchy of dimension values 1000 defined for the Product dimension. Next, query processor 130 sends the retrieved data to application 125 and application 125 forwards it to data manager 115.

The data that data manager 115 receives from application 125 is structured in a similar flat manner as that described above by reference to FIG. 4. Hence, data manager 115 generates a data structure that stores the data received from application 125 in a more optimized manner similar to that described above by reference to FIG. 5. Data manager 115 then sends the generated data structure to UI manager 110. UI manager 110 retrieves map data (e.g., a set of map tiles, a vector basemap) from a third-party map provider. Based on the data structure and the map data, UI manager 110 renders a visualization that includes the view of the map shown in FIG. 16 as well as visual elements 1605-1615 and displays it in display area 205. UI manager 110 rendered a visible element and an invisible element for each of the visual elements 1605-1615 in the same or similar manner explained above. As illustrated, visual elements 1605-1615 for the city regions of Chula Vista, El Cajon, and Dulzura. Each of the visual elements 1605-1615 are configured to present measure values for the Gross Margin measure for a particular city (i.e., dimension values in the fifth level) in the hierarchy of dimension values 900 and categorized according to dimension values in the third level of the hierarchy of dimension values 1000 defined for the Product dimension.

Figure 17:
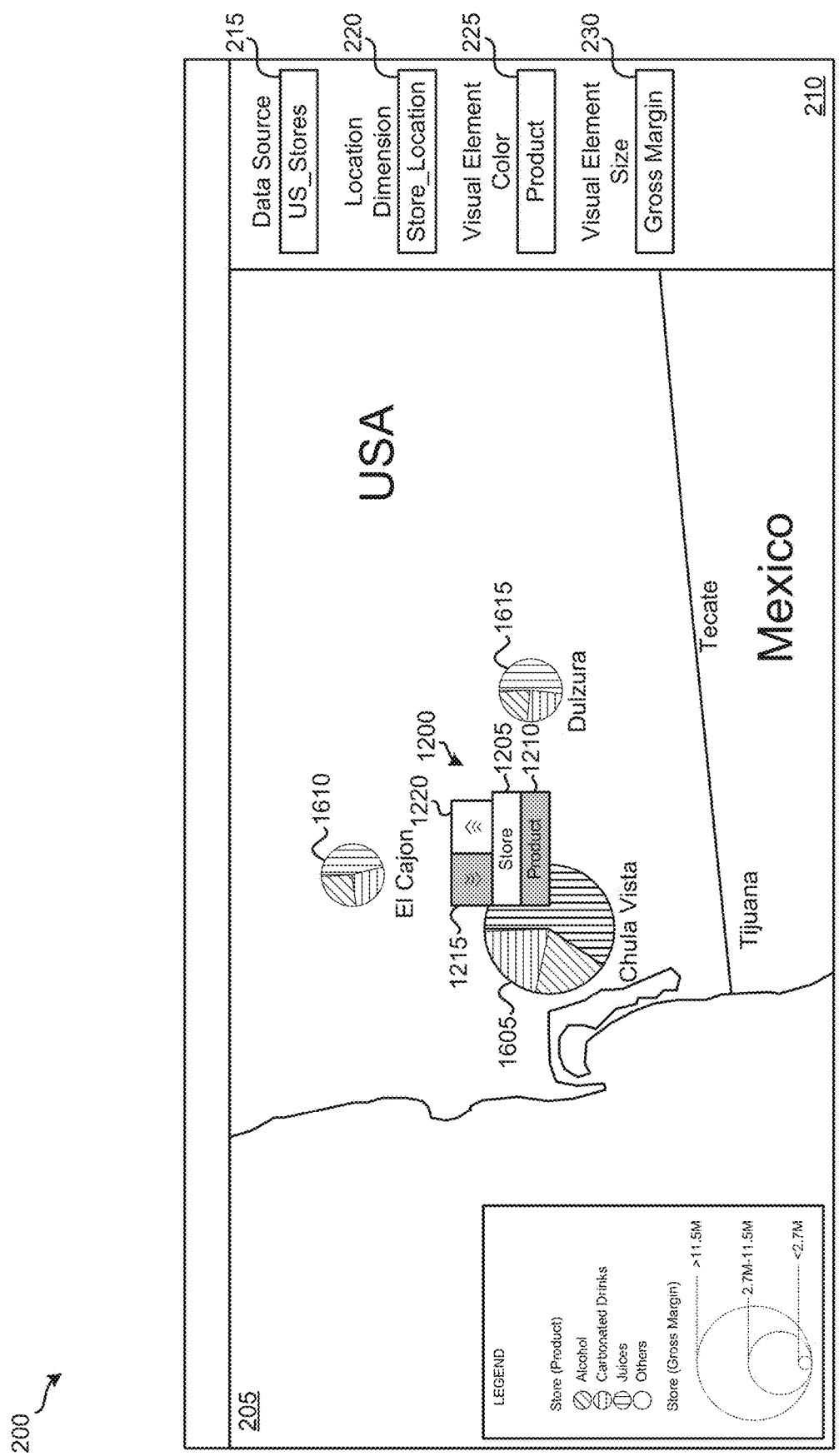
FIG. 17 illustrates a feature for requesting lower level dimension values according to some embodiments.

Continuing with the operation, the user of client device 105 selects the circular section of visual element 1605 associated with the Juices dimension value. UI manager 110 determines that the circular section of visual element 1605 associated with the Juices dimension value is selected in a similar manner described above. FIG. 17 illustrates GUI 200 after the user of client device 105 selected the circular section. In this example, when UI manager 110 received the selection, UI manager 110 replaced visual element 1605 with a new visual element that includes the selected section highlighted, as illustrated in FIG. 17.

FIG. 17 further illustrates a feature for requesting lower level dimension values according to some embodiments. As shown, display area 205 is displaying tool 1200. UI manager 110 provided tool 1200 in display area 205 in response to detecting input (e.g., a right-click, a hotkey, a keyboard shortcut, etc.) while a GUI pointer was on the circular section of visual element 1110 associated with the Juices dimension value. For this example, the user of client device 105 selected UI item 1210, as indicated by a highlighting of UI item 1210, to select hierarchy of dimension values 1000. Additionally, the user of client device 105 selected UI item 1215, as indicated by a highlighting of UI item 1215, in order to select dimension values one level lower than the current selected level in hierarchy of dimension values 1000. The current selected level in the hierarchy of dimension values 900 is the fifth level and the current selected level in the hierarchy of dimension values 1000 is the second level. Accordingly, in response to receiving the selection of UI item 1215, UI manager 110 sends data manager 115 a request for measure values for the Gross Margin measure categorized according to dimension values in the fifth level of the hierarchy of dimension values 900 defined for the Store_Location dimension and dimension values in the third level of the hierarchy of dimension values 1000 defined for the Product dimension.

Next, data manager 115 generates a query for the requested data from the US_Stores dataset and sends the query to application 125, which forwards it to query processor 130 for processing. Based on the query, query processor 130 accesses data storage 135, identifies in the US_Stores dataset the measure values for the Gross Margin measure categorized according to dimension values in the fifth level of the hierarchy of dimension values 900 defined for the Store_Location dimension and dimension values in the third level of the hierarchy of dimension values 1000 defined for the Product dimension. Then, query processor 130 sends the retrieved data to application 125, which forwards it to data manager 115.

The data that data manager 115 receives from application 125 is structured in a similar flat manner as that described above by reference to FIG. 4. As such, data manager 115 generates a data structure that stores the data received from application 125 in a more optimized manner similar to that described above by reference to FIG. 5. Data manager 115 then sends the generated data structure to UI manager 110. Based on the data structure and the map data (which was previously retrieved for rendering the visualization in FIG. 16), UI manager 110 renders a visualization that includes the view of the map and the requested data and displays it in display area 205. UI manager 110 also renders in the visualization visual elements for the county regions. However, the visual elements that UI manager 110 render at this stage of the operation are configured to present measure values for the Gross Margin measure for a particular city in the hierarchy of dimension values 900 and categorized according to dimension values in the third level of the hierarchy of dimension values 1000 defined for the Product dimension.

Figure 18:
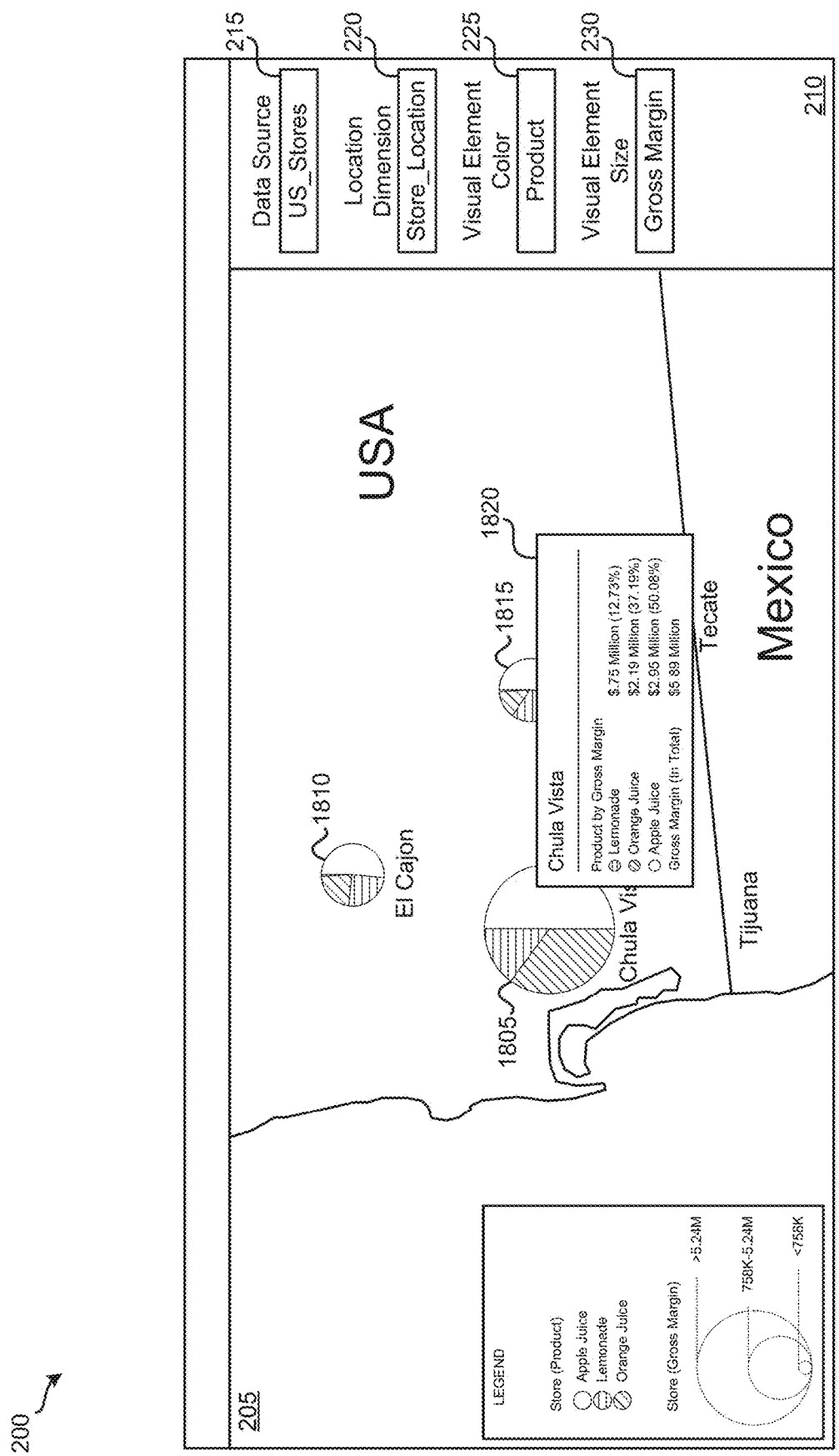
FIG. 18 illustrates an example of providing dimension-based visual elements using lower level dimension values according to some embodiments.

FIG. 18 illustrates an example of providing dimension-based visual elements using lower level dimension values according to some embodiments. In particular, FIG. 13 illustrates GUI 200 after the user of client device selected UI item 1215 in tool 1200 shown in FIG. 17 and UI manager 110 has, in response, rendered and provided the visualization in display area 205. As shown in FIG. 18, display area 205 is displaying a visualization that includes the same view of the map as that illustrated in FIG. 17. Instead of visual elements 1605-1615, the visualization shown in FIG. 18 includes visual elements 1805-1815. UI manager 110 rendered a visible element and an invisible element for each of the visual elements 1305-1315 in the same or similar manner described above. Each of the visual elements 1805-1815 is configured to present measure values for the Gross Margin measure for a particular city in the hierarchy of dimension values 900 and categorized according to dimension values in the third level of the hierarchy of dimension values 1000 defined for the Product dimension. For this example, UI manager 110 also detects, via the invisible element of visual element 1805, a GUI pointer hovering over visual element 1805 for a defined threshold amount of time. In response, UI manager 110 rendered popup display area 1820 for visual element 1805 and provided it adjacent to visual element 1805 in display area 205 (e.g., by superimposing popup display area 1820 over the visual elements 1805 and 1815 and the view of the map). As illustrated, popup display area 1820 includes a table that is presenting the measure values for the Gross Margin measure associated with the city of Chula Vista and categorized according to dimension values in the third level of the hierarchy of dimension values 1000 defined for the Product dimension.

Figure 19:
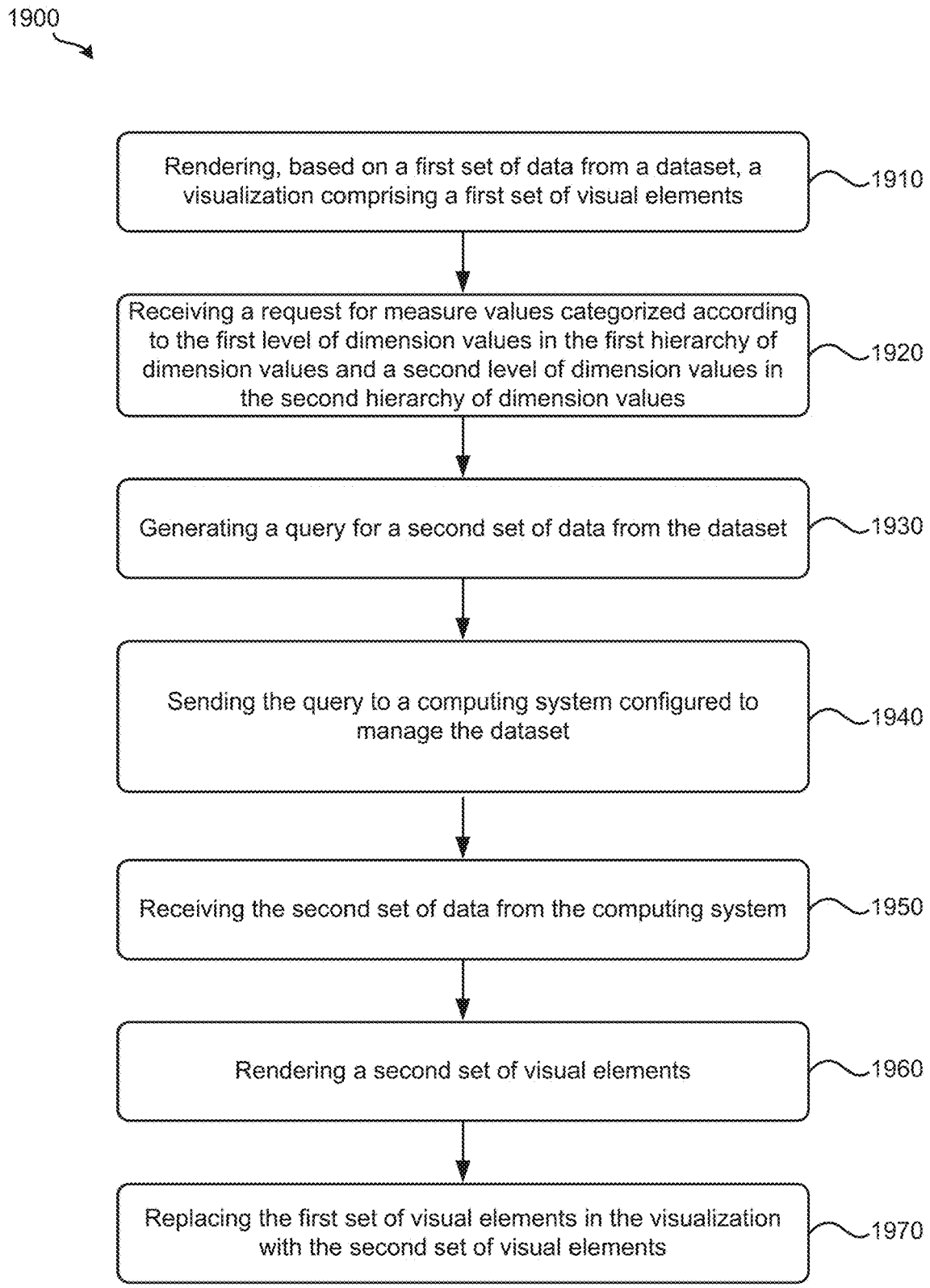
FIG. 19 illustrates a process for traversing hierarchical dimensions according to some embodiments.

FIG. 19 illustrates a process 1900 for traversing hierarchical dimensions according to some embodiments. In some embodiments, client device 105 performs process 1900. Process 1900 begins by rendering, at 1910, based on a first set of data from a dataset, a visualization comprising a first set of visual elements. Each visual element in the first set of visual elements is configured to present a first set of measure values for a measure in the first set of data categorized according to a first level of dimension values in a first hierarchy of dimension values defined for a first dimension in the first set of data and a first level of dimension values in a second hierarchy of dimension values defined for a second dimension in the first set of data. Referring to FIGS. 1 and 12 as an example, UI manager 110 renders a visualization comprising visual elements 1105-1115 based on measure values for the Gross Margin measure categorized according to dimension values in the fourth level of the hierarchy of dimension values 900 defined for the Store Location dimension and dimension values in the second level of the hierarchy of dimension values 1000 defined for the Product dimension.

Next, process 1900 receives, at 1920, a request for measure values categorized according to the first level of dimension values in the first hierarchy of dimension values and a second level of dimension values in the second hierarchy of dimension values. The second level of dimension values in the second hierarchy of dimension values is lower than the first level of dimension values in the second hierarchy of dimension values. Referring to FIGS. 1 and 12 as an example, UI manager 110 receives a selection of UI item 1210 to select hierarchy of dimension values 1000 and a selection of UI item 1215 to select dimension values one level lower than the current selected level in hierarchy of dimension values 1000.

Process 1900 then generates, at 1930, a query for a second set of data from the dataset. The second set of data comprises the measure in the set of measures categorized according to the first level of dimension values in the first hierarchy of dimension values and the second level of dimension values in the second hierarchy of dimension values. Referring to FIGS. 1 and 12 as an example, data manager 115 generates a query for measure values for the Gross Margin measure categorized according to dimension values in the fourth level of the hierarchy of dimension values 900 defined for the Store Location dimension and dimension values in the third level of the hierarchy of dimension values 1000 defined for the Product dimension.

At 1940, process 1900 sends the query to a computing system configured to manage the dataset. Referring to FIG. 1 as an example, data manager 115 can send the query to computing system 120, which manages the dataset stored in data storage 135. Process 1900 then receives, at 1950, the second set of data from the computing system. Referring to FIG. 1 as an example, data manager 115 receives the set of data from computing system 120. Data manager 115 then sends the set of data to UI manager 110.

Next, process 1900 renders, at 1960, a second set of visual elements. Each visual element in the second set of visual elements is configured to present a second set of measure values for the measure in the second set of data categorized according to the first level of dimension values in the first hierarchy of dimension values and the second level of dimension values in the second hierarchy of dimension values. Referring to FIGS. 1 and 13 as an example, UI manager 110 renders visual elements 1305-1315. Each of the visual elements 1305-1315 is configured to present measure values for the Gross Margin measure for a particular county in the hierarchy of dimension values 900 and categorized according to dimension values in the third level of the hierarchy of dimension values 1000 defined for the Product dimension.

Finally, process 1900 replaces, at 1970, the first set of visual elements in the visualization with the second set of visual elements. Referring to FIGS. 1, 12, and 13, UI manager 110 replaces the visualization illustrated in FIG. 12 with the visualization illustrated in FIG. 13, thereby replacing visual elements 1105-1115 with visual elements 1305-1315.

Figure 20:
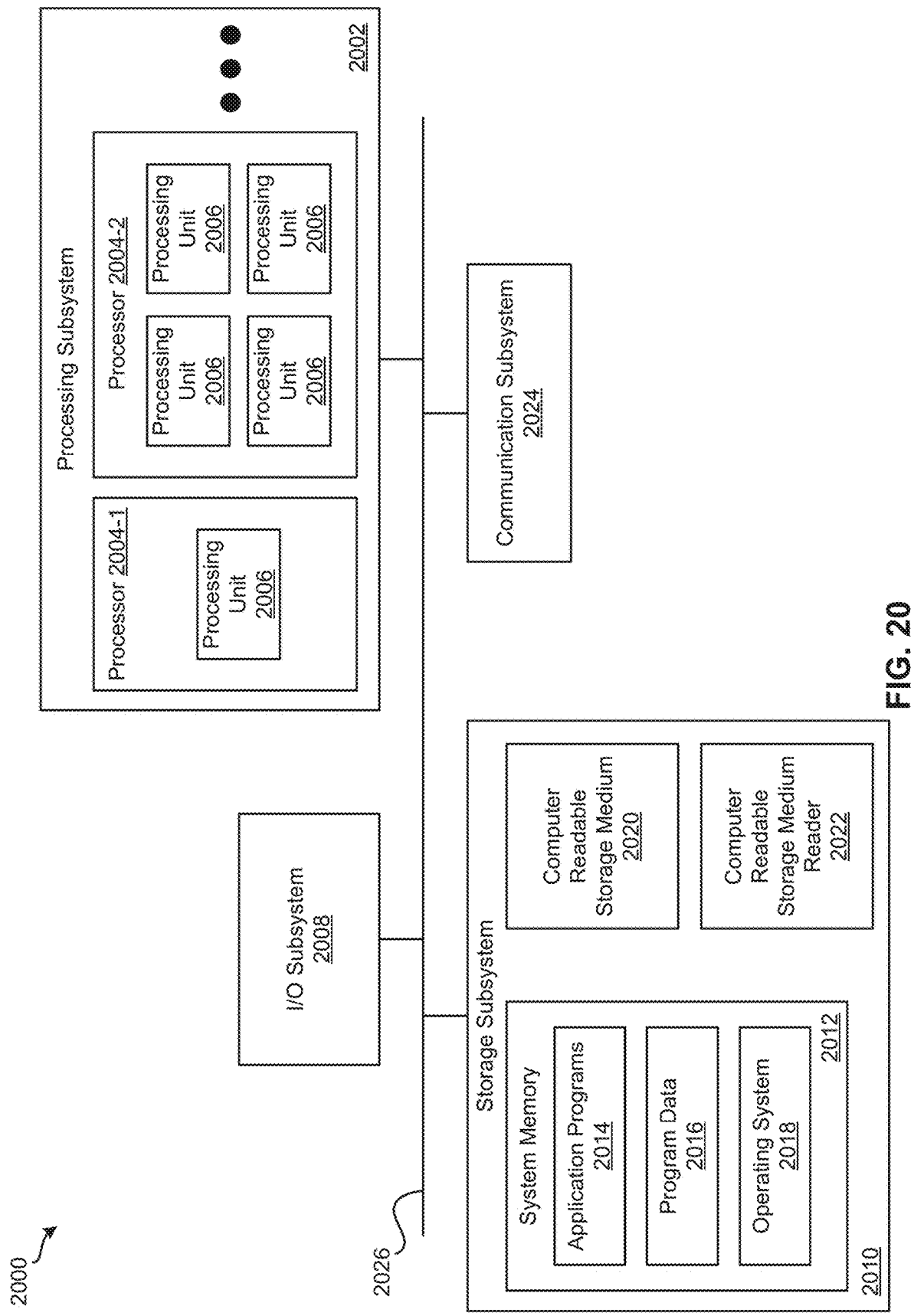
FIG. 20 illustrates an exemplary computer system, in which various embodiments may be implemented.

FIG. 20 illustrates an exemplary computer system 2000 for implementing various embodiments described above. For example, computer system 2000 may be used to implement client device 105 and computing system 120. Computer system 2000 may be a desktop computer, a laptop, a server computer, or any other type of computer system or combination thereof. Some or all elements of UI manager 110, data manager 115, application 125, query processor 130, or combinations thereof can be included or implemented in computer system 2000. In addition, computer system 2000 can implement many of the operations, methods, and/or processes described above (e.g., process 800 and process 1900). As shown in FIG. 20, computer system 2000 includes processing subsystem 2002, which communicates, via bus subsystem 2026, with input/output (I/O) subsystem 2008, storage subsystem 2010 and communication subsystem 2024.

Bus subsystem 2026 is configured to facilitate communication among the various components and subsystems of computer system 2000. While bus subsystem 2026 is illustrated in FIG. 20 as a single bus, one of ordinary skill in the art will understand that bus subsystem 2026 may be implemented as multiple buses. Bus subsystem 2026 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 2002, which can be implemented as one or more integrated circuits (e.g., a conventional microprocessor or microcontroller), controls the operation of computer system 2000. Processing subsystem 2002 may include one or more processors 2004. Each processor 2004 may include one processing unit 2006 (e.g., a single core processor such as processor 2004-1) or several processing units 2006 (e.g., a multicore processor such as processor 2004-2). In some embodiments, processors 2004 of processing subsystem 2002 may be implemented as independent processors while, in other embodiments, processors 2004 of processing subsystem 2002 may be implemented as multiple processors integrate into a single chip or multiple chips. Still, in some embodiments, processors 2004 of processing subsystem 2002 may be implemented as a combination of independent processors and multiple processors integrated into a single chip or multiple chips.

In some embodiments, processing subsystem 2002 can execute a variety of programs or processes in response to program code and can maintain multiple concurrently executing programs or processes. At any given time, some or all of the program code to be executed can reside in processing subsystem 2002 and/or in storage subsystem 2010. Through suitable programming, processing subsystem 2002 can provide various functionalities, such as the functionalities described above by reference to process 800, process 1900, etc.

I/O subsystem 2008 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 2000 to a user or another device (e.g., a printer).

As illustrated in FIG. 20, storage subsystem 2010 includes system memory 2012, computer-readable storage medium 2020, and computer-readable storage medium reader 2022. System memory 2012 may be configured to store software in the form of program instructions that are loadable and executable by processing subsystem 2002 as well as data generated during the execution of program instructions. In some embodiments, system memory 2012 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 2012 may include different types of memory, such as static random access memory (SRAM) and/or dynamic random access memory (DRAM). System memory 2012 may include a basic input/output system (BIOS), in some embodiments, that is configured to store basic routines to facilitate transferring information between elements within computer system 2000 (e.g., during start-up). Such a BIOS may be stored in ROM (e.g., a ROM chip), flash memory, or any other type of memory that may be configured to store the BIOS.

As shown in FIG. 20, system memory 2012 includes application programs 2014 (e.g., application 125), program data 2016, and operating system (OS) 2018. OS 2018 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 2020 may be a non-transitory computer-readable medium configured to store software (e.g., programs, code modules, data constructs, instructions, etc.). Many of the components (e.g., UI manager 110, data manager 115, application 125, and query processor 130) and/or processes (e.g., process 800 and process 1900) described above may be implemented as software that when executed by a processor or processing unit (e.g., a processor or processing unit of processing subsystem 2002) performs the operations of such components and/or processes. Storage subsystem 2010 may also store data used for, or generated during, the execution of the software.

Storage subsystem 2010 may also include computer-readable storage medium reader 2022 that is configured to communicate with computer-readable storage medium 2020. Together and, optionally, in combination with system memory 2012, computer-readable storage medium 2020 may comprehensively represent remote, local, fixed, and/or removable storage devices plus storage media for temporarily and/or more permanently containing, storing, transmitting, and retrieving computer-readable information.

Computer-readable storage medium 2020 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 2024 serves as an interface for receiving data from, and transmitting data to, other devices, computer systems, and networks. For example, communication subsystem 2024 may allow computer system 2000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 2024 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 2024 may provide components configured for wired communication (e.g., Ethernet) in addition to or instead of components configured for wireless communication.

One of ordinary skill in the art will realize that the architecture shown in FIG. 20 is only an example architecture of computer system 2000, and that computer system 2000 may have additional or fewer components than shown, or a different configuration of components. The various components shown in FIG. 20 may be implemented in hardware, software, firmware or any combination thereof, including one or more signal processing and/or application specific integrated circuits.

Figure 21:
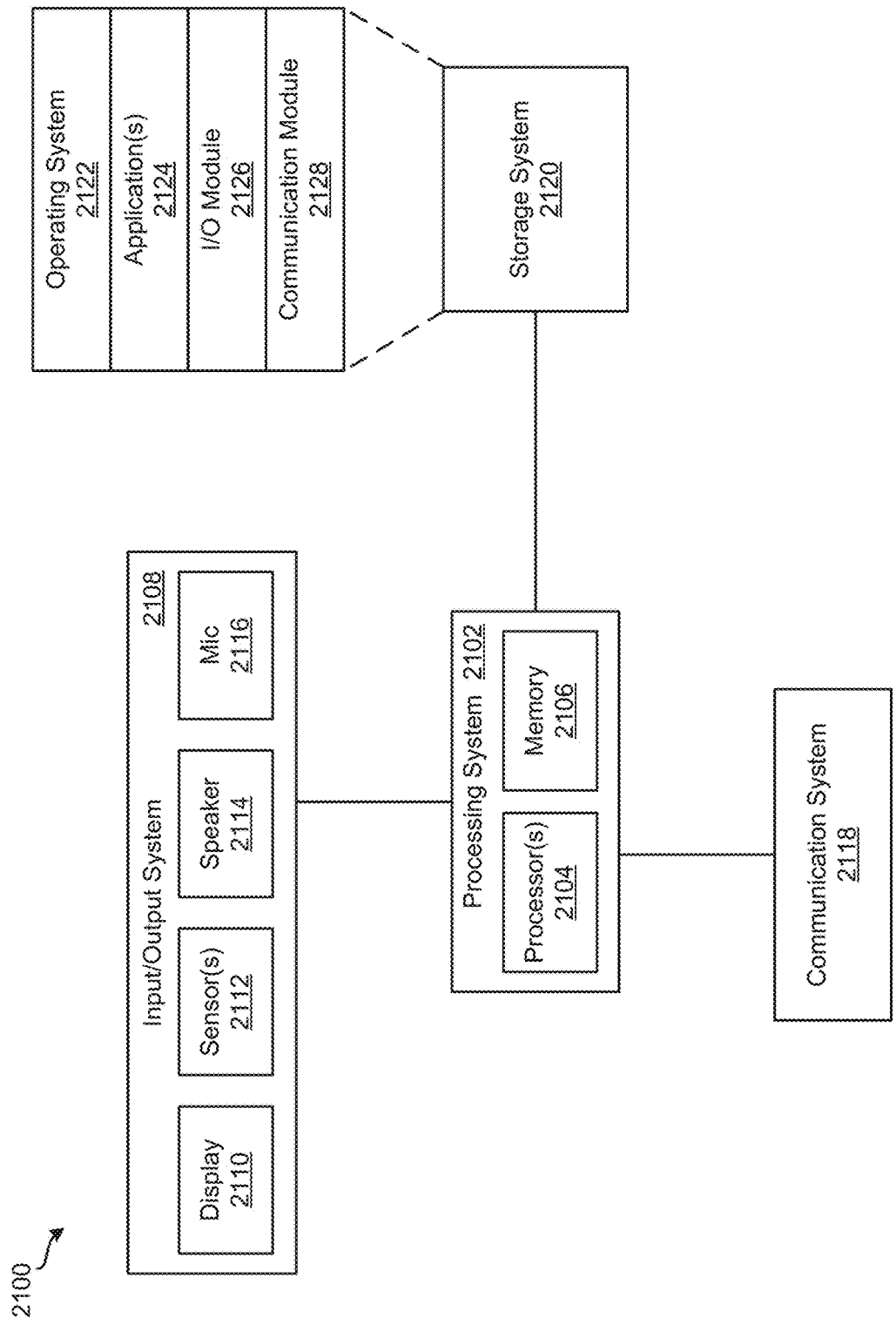
FIG. 21 illustrates an exemplary computing device, in which various embodiments may be implemented.

FIG. 21 illustrates an exemplary computing device 2100 for implementing various embodiments described above. For example, computing device 2100 may be used to implement client device 105. Computing device 2100 may be a cellphone, a smartphone, a wearable device, an activity tracker or manager, a tablet, a personal digital assistant (PDA), a media player, or any other type of mobile computing device or combination thereof. Some or all elements of UI manager 110, data manager 115, or combinations thereof can be included or implemented in computing device 2100. In addition, computing device 2100 can implement many of the operations, methods, and/or processes described above (e.g., process 800 and process 1900). As shown in FIG. 21, computing device 2100 includes processing system 2102, input/output (I/O) system 2108, communication system 2118, and storage system 2120. These components may be coupled by one or more communication buses or signal lines.

Processing system 2102, which can be implemented as one or more integrated circuits (e.g., a conventional microprocessor or microcontroller), controls the operation of computing device 2100. As shown, processing system 2102 includes one or more processors 2104 and memory 2106. Processors 2104 are configured to run or execute various software and/or sets of instructions stored in memory 2106 to perform various functions for computing device 2100 and to process data.

Each processor of processors 2104 may include one processing unit (e.g., a single core processor) or several processing units (e.g., a multicore processor). In some embodiments, processors 2104 of processing system 2102 may be implemented as independent processors while, in other embodiments, processors 2104 of processing system 2102 may be implemented as multiple processors integrate into a single chip. Still, in some embodiments, processors 2104 of processing system 2102 may be implemented as a combination of independent processors and multiple processors integrated into a single chip.

Memory 2106 may be configured to receive and store software (e.g., operating system 2122, applications 2124, I/O module 2126, communication module 2128, etc. from storage system 2120) in the form of program instructions that are loadable and executable by processors 2104 as well as data generated during the execution of program instructions. In some embodiments, memory 2106 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 2108 is responsible for receiving input through various components and providing output through various components. As shown for this example, I/O system 2108 includes display 2110, one or more sensors 2112, speaker 2114, and microphone 2116. Display 2110 is configured to output visual information (e.g., a graphical user interface (GUI) generated and/or rendered by processors 2104). In some embodiments, display 2110 is a touch screen that is configured to also receive touch-based input. Display 2110 may be implemented using liquid crystal display (LCD) technology, light-emitting diode (LED) technology, organic LED (OLED) technology, organic electro luminescence (OEL) technology, or any other type of display technologies. Sensors 2112 may include any number of different types of sensors for measuring a physical quantity (e.g., temperature, force, pressure, acceleration, orientation, light, radiation, etc.). Speaker 2114 is configured to output audio information and microphone 2116 is configured to receive audio input. One of ordinary skill in the art will appreciate that I/O system 2108 may include any number of additional, fewer, and/or different components. For instance, I/O system 2108 may include a keypad or keyboard for receiving input, a port for transmitting data, receiving data and/or power, and/or communicating with another device or component, an image capture component for capturing photos and/or videos, etc.

Communication system 2118 serves as an interface for receiving data from, and transmitting data to, other devices, computer systems, and networks. For example, communication system 2118 may allow computing device 2100 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 2118 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 2118 may provide components configured for wired communication (e.g., Ethernet) in addition to or instead of components configured for wireless communication.

Storage system 2120 handles the storage and management of data for computing device 2100. Storage system 2120 may be implemented by one or more non-transitory machine-readable mediums that are configured to store software (e.g., programs, code modules, data constructs, instructions, etc.) and store data used for, or generated during, the execution of the software. Many of the components (e.g., UI manager 110 and data manager 115) and/or processes (e.g., process 800 and process 1900) described above may be implemented as software that when executed by a processor or processing unit (e.g., processors 2104 of processing system 2102) performs the operations of such components and/or processes.

In this example, storage system 2120 includes operating system 2122, one or more applications 2124, I/O module 2126, and communication module 2128. Operating system 2122 includes various procedures, sets of instructions, software components and/or drivers for controlling and managing general system tasks (e.g., memory management, storage device control, power management, etc.) and facilitates communication between various hardware and software components. Operating system 2122 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 2124 can include any number of different applications installed on computing device 2100. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 2126 manages information received via input components (e.g., display 2110, sensors 2112, and microphone 2116) and information to be outputted via output components (e.g., display 2110 and speaker 2114). Communication module 2128 facilitates communication with other devices via communication system 2118 and includes various software components for handling data received from communication system 2118.

One of ordinary skill in the art will realize that the architecture shown in FIG. 21 is only an example architecture of computing device 2100, and that computing device 2100 may have additional or fewer components than shown, or a different configuration of components. The various components shown in FIG. 21 may be implemented in hardware, software, firmware or any combination thereof, including one or more signal processing and/or application specific integrated circuits.

Figure 22:
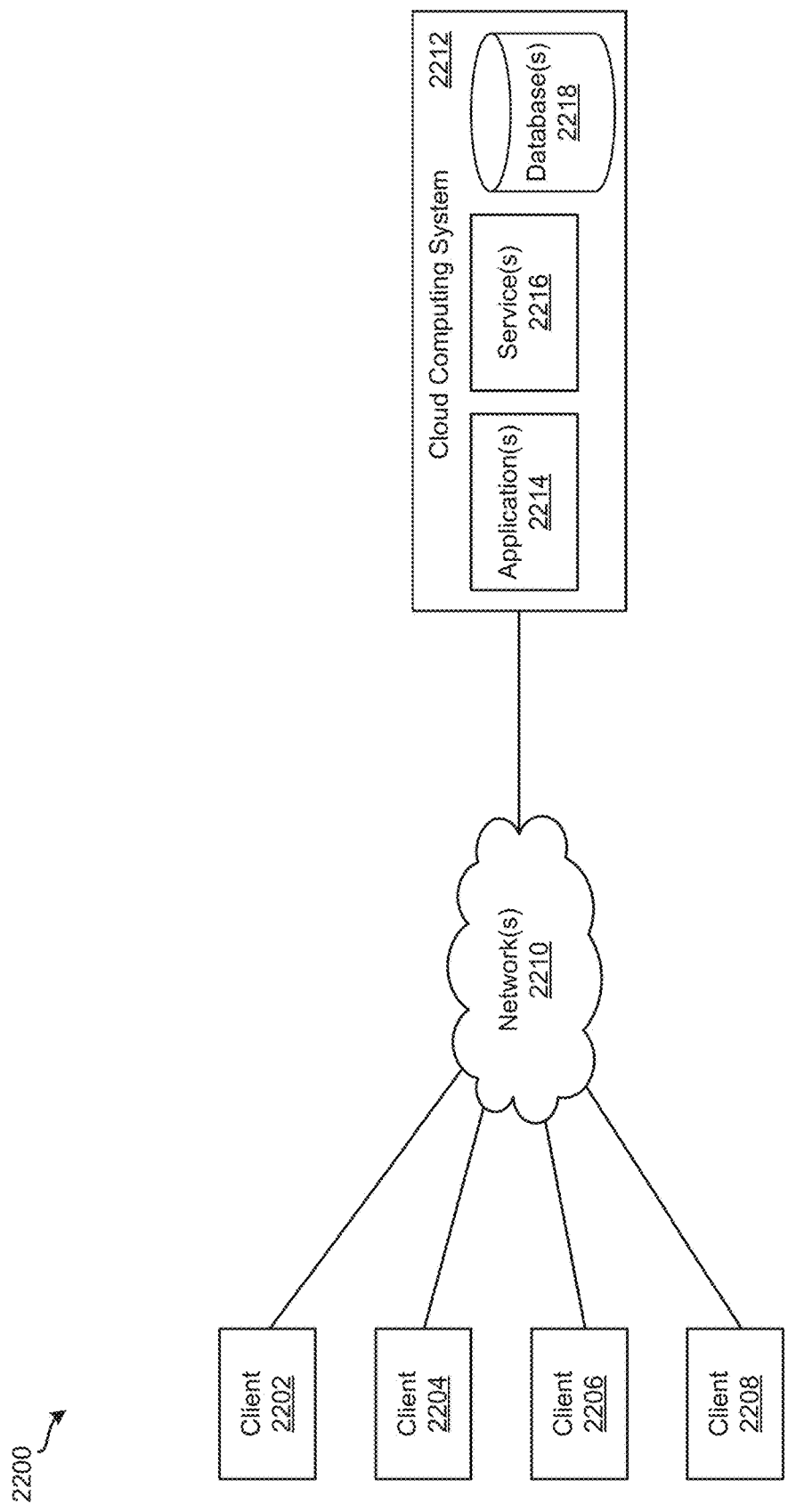
FIG. 22 illustrates an exemplary system, in which various embodiments may be implemented.

FIG. 22 illustrates an exemplary system 2200 for implementing various embodiments described above. For example, cloud computing system 2212 may be used to implement computing system 120 and client devices 2202-2208 may be used to implement client device 105. As shown, system 2200 includes client devices 2202-2208, one or more networks 2210, and cloud computing system 2212. Cloud computing system 2212 is configured to provide resources and data to client devices 2202-2208 via networks 2210. In some embodiments, cloud computing system 2200 provides resources to any number of different users (e.g., customers, tenants, organizations, etc.). Cloud computing system 2212 may be implemented by one or more computer systems (e.g., servers), virtual machines operating on a computer system, or a combination thereof.

As shown, cloud computing system 2212 includes one or more applications 2214, one or more services 2216, and one or more databases 2218. Cloud computing system 2200 may provide applications 2214, services 2216, and databases 2218 to any number of different customers in a self-service, subscription-based, elastically scalable, reliable, highly available, and secure manner.

In some embodiments, cloud computing system 2200 may be adapted to automatically provision, manage, and track a customer's subscriptions to services offered by cloud computing system 2200. Cloud computing system 2200 may provide cloud services via different deployment models. For example, cloud services may be provided under a public cloud model in which cloud computing system 2200 is owned by an organization selling cloud services and the cloud services are made available to the general public or different industry enterprises. As another example, cloud services may be provided under a private cloud model in which cloud computing system 2200 is operated solely for a single organization and may provide cloud services for one or more entities within the organization. The cloud services may also be provided under a community cloud model in which cloud computing system 2200 and the cloud services provided by cloud computing system 2200 are shared by several organizations in a related community. The cloud services may also be provided under a hybrid cloud model, which is a combination of two or more of the aforementioned different models.

In some instances, any one of applications 2214, services 2216, and databases 2218 made available to client devices 2202-2208 via networks 2210 from cloud computing system 2200 is referred to as a "cloud service." Typically, servers and systems that make up cloud computing system 2200 are different from the on-premises servers and systems of a customer. For example, cloud computing system 2200 may host an application and a user of one of client devices 2202-2208 may order and use the application via networks 2210.

Applications 2214 may include software applications that are configured to execute on cloud computing system 2212 (e.g., a computer system or a virtual machine operating on a computer system) and be accessed, controlled, managed, etc. via client devices 2202-2208. In some embodiments, applications 2214 may include server applications and/or mid-tier applications (e.g., HTTP (hypertext transport protocol) server applications, FTP (file transfer protocol) server applications, CGI (common gateway interface) server applications, JAVA server applications, etc.). Services 2216 are software components, modules, application, etc. that are configured to execute on cloud computing system 2212 and provide functionalities to client devices 2202-2208 via networks 2210. Services 2216 may be web-based services or on-demand cloud services.

Databases 2218 are configured to store and/or manage data that is accessed by applications 2214, services 2216, and/or client devices 2202-2208. For instance, data storages 135 may be stored in databases 2218. Databases 2218 may reside on a non-transitory storage medium local to (and/or resident in) cloud computing system 2212, in a storage-area network (SAN), on a non-transitory storage medium local located remotely from cloud computing system 2212. In some embodiments, databases 2218 may include relational databases that are managed by a relational database management system (RDBMS). Databases 2218 may be a column-oriented databases, row-oriented databases, or a combination thereof. In some embodiments, some or all of databases 2218 are in-memory databases. That is, in some such embodiments, data for databases 2218 are stored and managed in memory (e.g., random access memory (RAM)).

Client devices 2202-2208 are configured to execute and operate a client application (e.g., a web browser, a proprietary client application, etc.) that communicates with applications 2214, services 2216, and/or databases 2218 via networks 2210. This way, client devices 2202-2208 may access the various functionalities provided by applications 2214, services 2216, and databases 2218 while applications 2214, services 2216, and databases 2218 are operating (e.g., hosted) on cloud computing system 2200. Client devices 2202-2208 may be computer system 2000 or computing device 2100, as described above by reference to FIGS. 20 and 21, respectively. Although system 2200 is shown with four client devices, any number of client devices may be supported.

Networks 2210 may be any type of network configured to facilitate data communications among client devices 2202-2208 and cloud computing system 2212 using any of a variety of network protocols. Networks 2210 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   generating a query for a set of data from a dataset, the dataset comprising a set of measures and a plurality of dimensions for categorizing the set of measures, the set of data comprising a set of locations and measure values for a measure in the set of measures categorized according to a dimension in the plurality of dimensions, each location in the set of locations representing a geographical location;
   sending the query to a computing system configured to manage the dataset;
   receiving the set of data from the computing system;
   rendering a visualization comprising a map and a set of visual elements, each visual element in the set of visual elements configured to present a set of measure values for the measure associated with a location in the set of locations, each measure value in the set of measure values categorized according to a different dimension value of the dimension, each visual element in the set of visual elements rendered over a location on the map corresponding to the geographical location represented by the location in the set of locations with which the set of measure values are associated; and
   presenting the visualization on a display of the device.

2. The non-transitory machine-readable medium of claim 1, wherein the set of data received from the computing system comprises a plurality of records, each record comprising a measure value for the measure, a dimension value for the dimension, and a location in the set of locations, wherein the program further comprises sets of instructions for generating a data structure based on the set of data by aggregating together records in the set of data having the same location, wherein rendering the visualization comprises rendering the visualization based on the generated data structure.

3. The non-transitory machine-readable medium of claim 1, wherein each visual element of the visualization comprises a visible element and an invisible element, the visible element configured to present the set of measure values of the measure associated with the location in the set of locations and categorized according to the dimension, the invisible element configured to receive input for interacting with the visual element.

4. The non-transitory machine-readable medium of claim 3, wherein the visible element of each visual element comprises a set of sections, each section for presenting a measure value in the set of measure values associated with a dimension value of the dimension.

5. The non-transitory machine-readable medium of claim 4, wherein the program further comprises sets of instructions for:
   receiving a selection of a location within a visual element;
   determining a first set of coordinates of the location within the visual element;
   determining a second set of coordinates of a location of a center of the visual element; and
   determining an angle between a first line formed by a defined set of coordinates within the visual element and the second set of coordinates and a second line formed by the first set of coordinate and the second set of coordinates.

6. The non-transitory machine-readable medium of claim 5, wherein the program further comprises sets of instructions for:
   based on the determined angle, determining a selected section;
   generating a new visual element that includes the selected section highlighted; and
   replacing the visual element in the visualization with the new visual element.

7. The non-transitory machine-readable medium of claim 5, wherein the program further comprises a set of instructions for providing for the selected section a display area configured to present the measure value for the measure associated the dimension value represented by the selected section.

8. A method, executable by a device, comprising:
   generating a query for a set of data from a dataset, the dataset comprising a set of measures and a plurality of dimensions for categorizing the set of measures, the set of data comprising a set of locations and measure values for a measure in the set of measures categorized according to a dimension in the plurality of dimensions, each location in the set of locations representing a geographical location;
   sending the query to a computing system configured to manage the dataset;
   receiving the set of data from the computing system;
   rendering a visualization comprising a map and a set of visual elements, each visual element in the set of visual elements configured to present a set of measure values for the measure associated with a location in the set of locations, each measure value in the set of measure values categorized according to a different dimension value of the dimension, each visual element in the set of visual elements rendered over a location on the map corresponding to the geographical location represented by the location in the set of locations with which the set of measure values are associated; and
   presenting the visualization on a display of the device.

9. The method of claim 8, wherein the set of data received from the computing system comprises a plurality of records, each record comprising a measure value for the measure, a dimension value for the dimension, and a location in the set of locations, wherein the method further comprises generating a data structure based on the set of data by aggregating together records in the set of data having the same location, wherein rendering the visualization comprises rendering the visualization based on the generated data structure.

10. The method of claim 8, wherein each visual element of the visualization comprises a visible element and an invisible element, the visible element configured to present the set of measure values of the measure associated with the location in the set of locations and categorized according to the dimension, the invisible element configured to receive input for interacting with the visual element.

11. The method of claim 10, wherein the visible element of each visual element comprises a set of sections, each section for presenting a measure value in the set of measure values associated with a dimension value of the dimension.

12. The method of claim 11 further comprising:
receiving a selection of a location within a visual element;
determining a first set of coordinates of the location within the visual element;
determining a second set of coordinates of a location of a center of the visual element; and
determining an angle between a first line formed by a defined set of coordinates within the visual element and the second set of coordinates and a second line formed by the first set of coordinate and the second set of coordinates.

13. The method of claim 12 further comprising:
based on the determined angle, determining a selected section;
generating a new visual element that includes the selected section highlighted; and
replacing the visual element in the visualization with the new visual element.

14. The method of claim 12 further comprising providing for the selected section a display area configured to present the measure value for the measure associated the dimension value represented by the selected section.

15. A system comprising:
a set of processing units; and
a non-transitory machine-readable medium storing instructions that when executed by at least one processing unit in the set of processing units cause the at least one processing unit to:
generate a query for a set of data from a dataset, the dataset comprising a set of measures and a plurality of dimensions for categorizing the set of measures, the set of data comprising a set of locations and measure values for a measure in the set of measures categorized according to a dimension in the plurality of dimensions, each location in the set of locations representing a geographical location;
send the query to a computing system configured to manage the dataset;
receive the set of data from the computing system;
render a visualization comprising a map and a set of visual elements, each visual element in the set of visual elements configured to present a set of measure values for the measure associated with a location in the set of locations, each measure value in the set of measure values categorized according to a different dimension value of the dimension, each visual element in the set of visual elements rendered over a location on the map corresponding to the geographical location represented by the location in the set of locations with which the set of measure values are associated; and
present the visualization on a display of the system.

16. The system of claim 15, wherein the set of data received from the computing system comprises a plurality of records, each record comprising a measure value for the measure, a dimension value for the dimension, and a location in the set of locations, wherein the instructions further cause the at least one processing unit to generate a data structure based on the set of data by aggregating together records in the set of data having the same location, wherein rendering the visualization comprises rendering the visualization based on the generated data structure.

17. The system of claim 15, wherein each visual element of the visualization comprises a visible element and an invisible element, the visible element configured to present the set of measure values of the measure associated with the location in the set of locations and categorized according to the dimension, the invisible element configured to receive input for interacting with the visual element.

18. The system of claim 17, wherein the visible element of each visual element comprises a set of sections, each section for presenting a measure value in the set of measure values associated with a dimension value of the dimension.

19. The system of claim 18, wherein the instructions further cause the at least one processing unit to:
receive a selection of a location within a visual element;
determine a first set of coordinates of the location within the visual element;
determine a second set of coordinates of a location of a center of the visual element; and
determine an angle between a first line formed by a defined set of coordinates within the visual element and the second set of coordinates and a second line formed by the first set of coordinate and the second set of coordinates.

20. The system of claim 15, wherein the instructions further cause the at least one processing unit to:
based on the determined angle, determine a selected section;
generate a new visual element that includes the selected section highlighted; and
replace the visual element in the visualization with the new visual element.

* * * * *

UNITED STATES PATENT AND TRADEMARK OFFICE
CERTIFICATE OF CORRECTION

| | |
|---|---|
| PATENT NO. | : 11,526,526 B2 |
| APPLICATION NO. | : 16/672067 |
| DATED | : December 13, 2022 |
| INVENTOR(S) | : Xin Qiu et al. |

It is certified that error appears in the above-identified patent and that said Letters Patent is hereby corrected as shown below:

On the Title Page

Item [73] delete "SAP SE", and insert -- "BUSINESS OBJECTS SOFTWARE LTD" --

Signed and Sealed this
Seventeenth Day of January, 2023

Katherine Kelly Vidal
*Director of the United States Patent and Trademark Office*